United States Patent [19]

Louth

[11] Patent Number: 4,538,190
[45] Date of Patent: Aug. 27, 1985

[54] PROGRAMMABLE NON-LINEAR SPEED CONTROL FOR A RECORDING AND/OR REPRODUCING APPARATUS

[75] Inventor: Kenneth Louth, Los Altos, Calif.

[73] Assignee: Ampex Corporation, Redwood City, Calif.

[21] Appl. No.: 647,260

[22] Filed: Sep. 4, 1984

Related U.S. Application Data

[63] Continuation of Ser. No. 364,962, Apr. 2, 1982, abandoned.

[51] Int. Cl.³ .............................................. G11B 15/44
[52] U.S. Cl. ..................................... 360/73; 360/10.3
[58] Field of Search ...................... 360/9.1, 10.1, 10.2, 360/10.3, 70, 73

[56] References Cited

U.S. PATENT DOCUMENTS 4,004,205  1/1977  Yamamoto et al. .................. 318/608

OTHER PUBLICATIONS

IEEE Transactions On Consumer Electronics, vol. CE-27, Feb. 1981 pp. 71-71 Kobori et al.: One Chip Servo System LSI For Home VCR.

*Primary Examiner*—George G. Stellar
*Attorney, Agent, or Firm*—James A. LaBarre; Ralph L. Mossino; Joel D. Talcott

[57] ABSTRACT

A monlinear speed control for special motion reproducing of a video recording and reproducing apparatus is disclosed. The apparatus is of the type which has an automatic scan tracking servo which controls the position of the reproduced heads carried by the scanning drum which are of the type which can be transversely moved relative to the longitudinal direction of recorded tracks so as to accurately follow the tracks during variable speed special effect reproducing modes. The nonlinear control controls the longitudinal tape speed through the capstan servo and provides vernier control where it should be desirably located so that the operator can accurately control the special effect speeds. The nonlinear control also automatically compensates for changes in the speed and introduces a delay in the response to rapid changes that may occur at high speed special motion reproducing so that visually disturbing rapid changes in the video image will not be experienced by a viewer.

20 Claims, 12 Drawing Figures

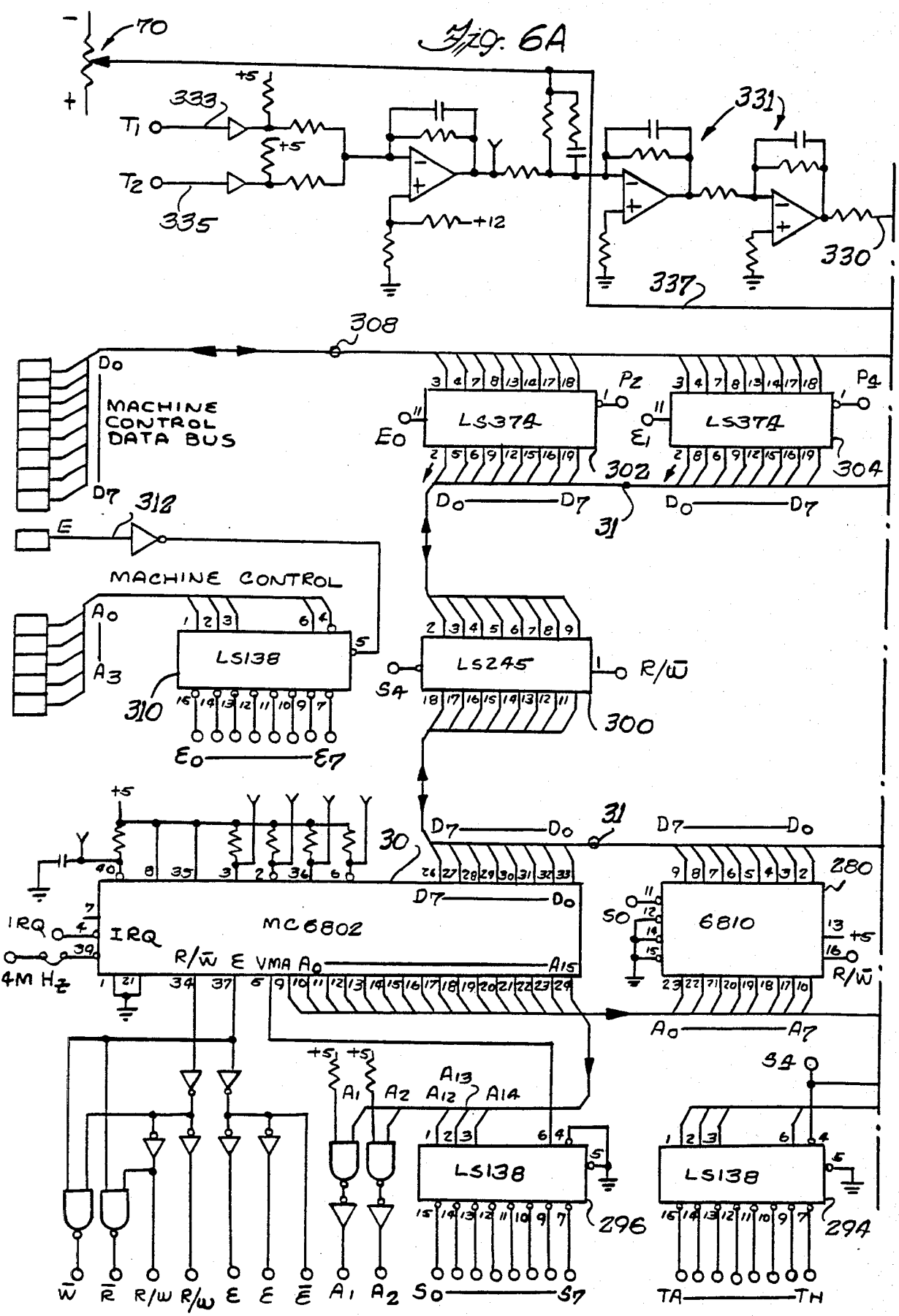

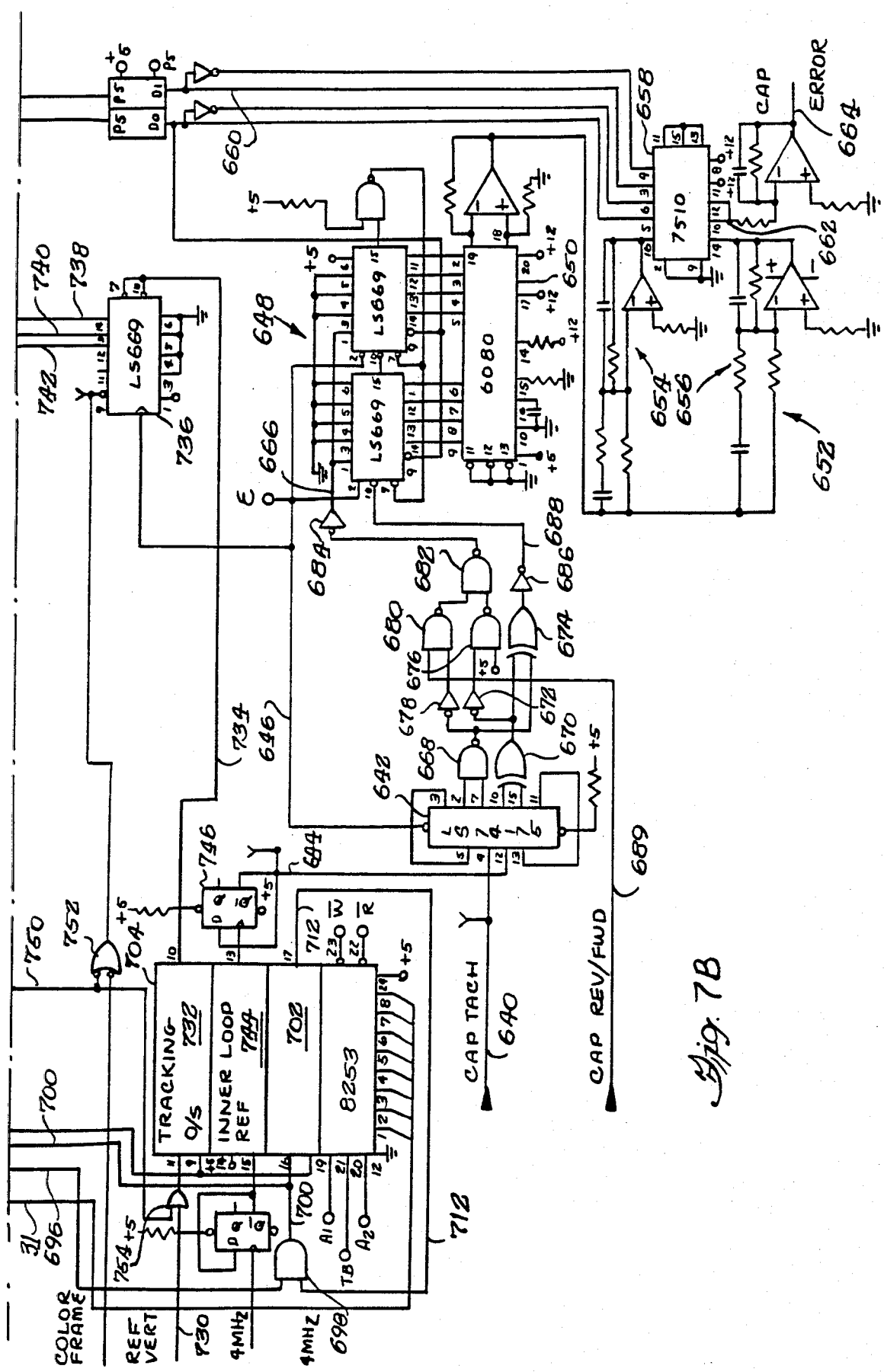

(a)

(b)

(c)

(d)

PROGRAMMABLE NON-LINEAR SPEED CONTROL FOR A RECORDING AND/OR REPRODUCING APPARATUS

This application is a continuation of application Ser. No. 364,962, filed Apr. 2, 1982, now abandoned.

CROSS REFERENCE TO RELATED APPLICATIONS

MICROPROCESSOR CONTROLLED MULTIPLE SERVO SYSTEM FOR A RECORDING AND/OR REPRODUCING APPARATUS, Ser. No. 364,725, filed Apr. 2, 1982, by Kenneth Louth.

MICROPROCESSOR CONTROLLED REPRODUCING APPARATUS HAVING ASYNCHRONOUS REPRODUCING CAPABILITY, Ser. No. 364,793, filed Apr. 2, 1982, by Kenneth Louth, abandoned in favor of continuation application Ser. No. 660,453, filed Oct. 2, 1984.

PHASE DETECTOR CONTROL FOR A SERVO SYSTEM, Ser. No. 707,161, filed Feb. 27, 1985 which is a continuation of Ser. No. 608,268 filed May 7, 1984, which is a continuation of Ser. No. 364,964, filed Apr. 2, 1982, by Kenneth Louth and now abandoned.

AN IMPROVED HEAD REEL SERVO SYSTEM IN A RECORDING AND/OR REPRODUCING APPARATUS, Ser. No. 364,652, filed Apr. 2, 1982, by Kenneth Louth, abandoned in favor of continuation application Ser. No. 655,983, filed Sept. 27, 1984.

AN IMPROVED AUTOMATIC SCAN TRACKING SERVO SYSTEM, Ser. No. 364,961, filed Apr. 2, 1982, by Kenneth Louth.

AN IMPROVED SCANNING SERVO SYSTEM IN A RECORDING AND/OR REPRODUCING APPARATUS, Ser. No. 364,963, filed Apr. 2, 1982, by Kenneth Louth, now U.S. Pat. No. 4,514,671.

The present invention generally relates to servo systems for recording and reproducing apparatus and, more particularly, to a programmable nonlinear speed control for a servo system of a magnetic tape recording and reproducing apparatus.

It is readily appreciated that video recording and reproducing apparatus, particularly, apparatus that records and reproduces video information of broadcast quality, is highly technical and complex equipment that requires sophisticated electronic as well as mechanical components and systems. For broadcast quality recording and reproducing apparatus, particularly video tape recording and reproducing apparatus, the level of technical sophistication is extraordinary in terms of the amount of control that is required to reliably operate the apparatus at broadcast quality standards. Such videotape recording apparatus have a number of servo systems which control their operation, including a servo system for controlling the rotation of the rotatable member carrying the recording and reproducing transducers or heads, the servo system which controls the reel drive motors which drive the supply and take-up reels and the capstan servo system which controls the speed with which the tape is driven during recording and reproducing.

Relatively recent developments in recording and reproducing apparatus include a servo system (herein sometimes referred to as automatic scan tracking servo) which controls a movable element carrying the reproducing head (or heads) to insure the reproducing head accurately follows recorded tracks, when the tape is transported at a velocity during the reproduction of the recorded information other than the velocity at which it was transported during recording. The movable element is controlled to move the head in a direction that is transverse relative to the longitudinal direction of the track so that the head accurately follows a recorded track to reproduce a quality signal regardless of whether the tape is transported at a velocity faster than normal record speed which results in the reproduction of a fast motion effect, or transported at a slower than normal velocity which results in the reproduction of a slow motion or even stop motion (still frame) effect. The considerations involved in such special motion reproducing effects are comprehensively set forth in the Hathaway et al. U.S. application Ser. No. 677,815, filed Apr. 16, 1976, abandoned in favor of continuation application Ser. No. 596,623, filed Feb. 3, 1984.

It will become apparent from the following description that the automatic scan tracking servo will cause the reproducing head to accurately follow a track during special motion reproducing, which include still frame reproducing, slow motion reproducing and faster than normal motion reproducing. Such variable motion control is usually accomplished by a potentiometer located on the front of the recording and reproducing machine, although a remote control device can also be used with the present apparatus. The potentiometer controls the speed and direction of transport of the tape via the capstan servo and the automatic scan tracking servo maintains the head on a track during reproducing at any of the variable speeds. Thus, to control the special motion effect speed during reproducing, the servo systems of the present invention cooperate to produce the desired effect.

The potentiometer provides an analog output signal that is provided to an analog-to-digital converter which converts the potentiometer setting to an 8-bit word, which is applied to the microprocessor and is subsequently forwarded to the capstan transport of the tape so that control the servo at the proper speed is achieved.

When the potentiometer setting is set to produce very slow motion reproducing, a one unit change in the potentiometer setting may result in a very small percentage change in the speed of transport of the tape. However, a similar one unit change at a high speed, tape transport faster than normal motion reproducing effects, may result in a significant percent change in the tape transport speed. Such relationship between the change in potentiometer setting and concomitant change in tape transport speed does not provide to an operator controlling the transport of the tape the desired feel of such control through manipulation of the potentiometer.

Accordingly, it is an object of the present invention to provide a programmable nonlinear speed control for the capstan servo which provides improved control manipulation feel to an operator.

Another object of the present invention is to provide a speed control of the foregoing type which provides vernier control of tape transport speed changes where such vernier control is desired without requiring an excessive amount of vernier control at very slow tape transport speeds.

Yet another object of the present invention is to provide a speed control of the foregoing type which provides greater vernier control at high tape transport speeds.

Still another object of the present invention is to provide a speed control of the foregoing type which also provides a delayed tape transport speed change response to speed control changes at high tape transport speeds so that rapid and visually display changes will not be experienced by a viewer.

Other objects and advantages will become apparent upon reading the following detailed description, while referring to the attached drawings.

DESCRIPTION OF THE DRAWINGS

FIGS. 6A and 6B together comprise a detailed electrical schematic diagram illustrating the microprocessor together with machine control interfacing circuitry and multiplexing analog-to-digital converting circuitry;

FIGS. 7A and 7B together comprise a detailed electrical circuit schematic diagram of the capstan servo circuitry of the apparatus, which detailed circuitry carries out the operation of the block diagram shown in FIG. 5;

DESCRIPTION OF THE APPARATUS

Broadly stated, the nonlinear speed control embodying the present invention is primarily associated with the capstan servo which is but one of the servo systems that includes a microprocessor which effectively controls all of the major servos of a tape recording and reproducing apparatus. The servos include: (1) a head scanner servo which maintains the rotation of the recording and reproducing heads at the proper speed during operations; (2) the automatic scan tracking servo which controls transverse movement of the reproducing head relative to the longitudinal direction of the track so that it accurately follows a track during reproducing and particularly during reproducing for special motion effects wherein the tape is being transported at a velocity other than normal playback velocity; (3) the reel servos which control the tensioning of the tape during recording and reproducing operations and the movement of the tape during shuttle operations; and, (4) the capstan servo which controls the transport of the tape during recording and during reproducing operations with the exception of still frame reproducing. The microprocessor receives digital information as well as digitally converted analog information from various locations throughout the circuitry and apparatus, processes such information and thereafter provides digital output signals to other circuitry, some signals of which are converted into the analog domain for controlling the various operations that are performed by the apparatus in its various modes. As stated in the foregoing introductory paragraphs, the automatic scan tracking servo effectively controls the transverse movement of the reproducing head so that it follows a track during reproducing and such is automatically done regardless of the tape speed, provided the tape speed is within appropriate limits of the apparatus. Since the nonlinear control of the tape transport velocity primarily is controlled by the capstan during reproducing at all tape transport velocities except stop or still frame reproducing only, the capstan servo will be described herein. The other servos, including the automatic scan tracking servo, are comprehensively described in the above cross referenced application entitled "Microprocessor Controlled Multiple Servo System for a Recording and/or Reproducing Apparatus", Ser. No. 364,725, filed on even date herewith and assigned to the same assignee as the present invention. The specification and drawings for such cross referenced application is specifically incorporated by reference herein. While only the capstan servo will be specifically described, it will be described in connection with the microprocessor control and other specific circuitry that is necessary to provide an understanding of the operation and construction of the capstan servo.

Figure 1:
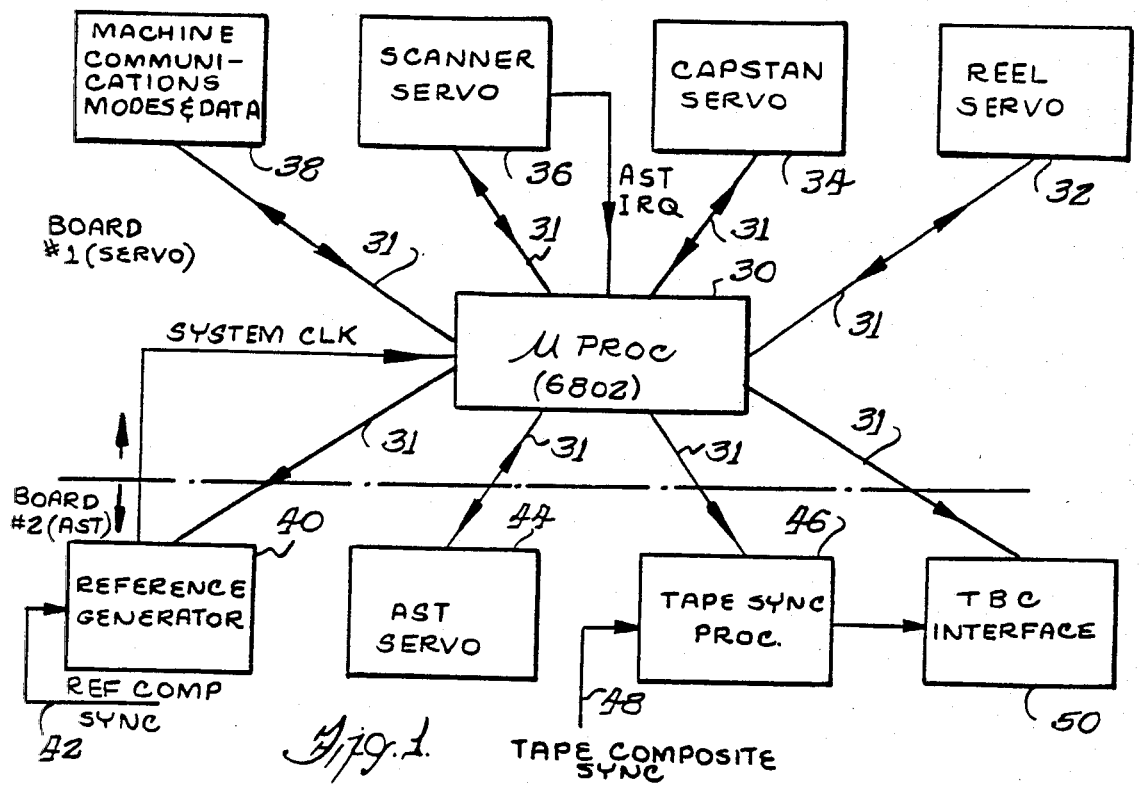
FIG. 1 is a functional block diagram illustrating the functional interaction of the microprocessor with the various servo systems of the apparatus, and of the microprocessor and other important circuitry.

Turning initially to the block diagram of FIG. 1, there is shown a microprocessor 30 which is interconnected by a data bus 31 with a reel servo 32, a capstan servo 34, a head scanner servo 36 and a machine communication data interface 38 which essentially controls the various operating modes of the recording and reproducing apparatus as manipulated by an operator either directly or from a remote location. The microprocessor also interacts with a reference generator 40 which receives as an input thereto a reference station composite sync signal via line 42. The reference generator generates system clocks that control the microprocessor, which in turn synchronizes all of the clock timing of the servos and other circuitry. The microprocessor also interacts with the automatic scan tracking servo 44 and a tape sync processor 46 which has a tape composite sync signal input via line 48. The tape sync processor additionally provides a signal to the time base corrector interface 50 which provides appropriate timing and control signals for use by the time base corrector to provide a broadcast quality video image having the requisite stability and vertical display position with respect to system reference as well as the correct chroma information, which processing varies depending upon the reproducing mode of the apparatus.

Figure 2:
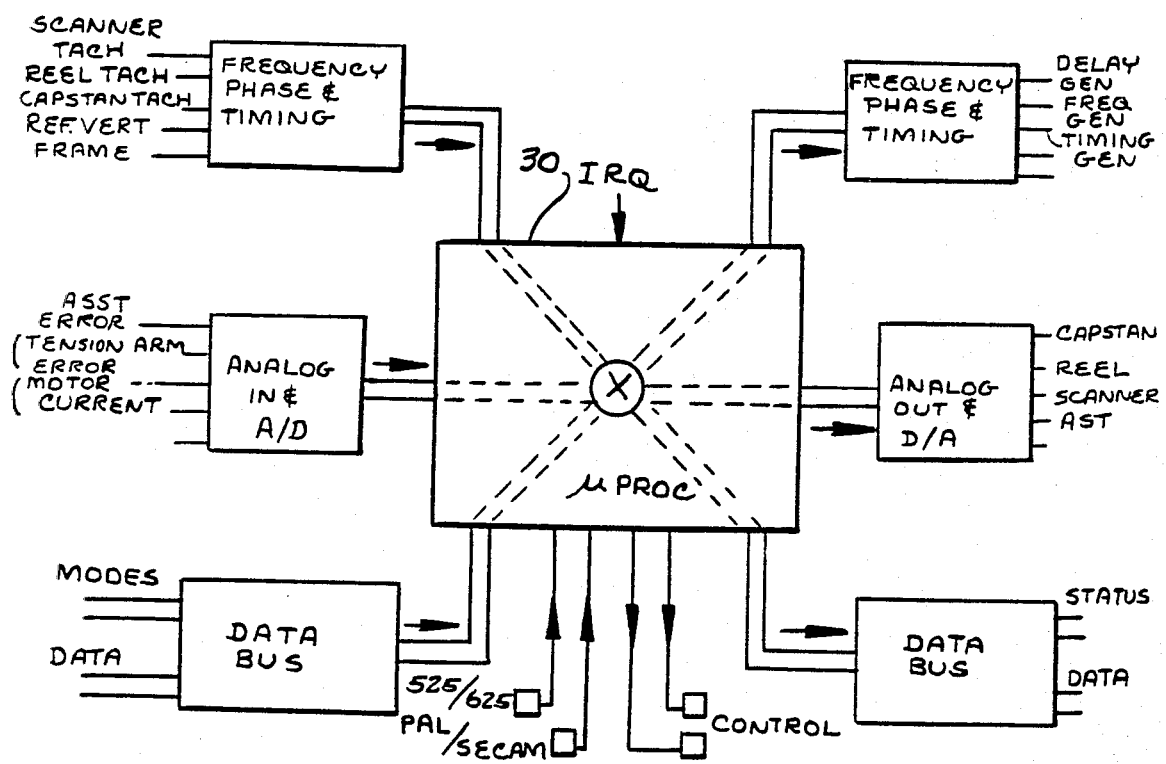
FIG. 2 is another functional block diagram of the microprocessor and illustrates the manner in which it receives input information relating to the operation of the apparatus and provides output signals that are used to control the operation of the apparatus.

While the functional block diagrams shown in FIG. 1 illustrate the interaction of the microprocessor with the various servo systems of the apparatus, with machine control and with the time base corrector and the like, the system can also be functionally described in terms of input and output signals that are provided to and from the microprocessor and the functional block diagram is shown in FIG. 2. The microprocessor 30 receives frequency, phase and timing data shown by the upper left functional block including such input signals as head scanner tach pulses, reel tach pulses, capstan tach pulses, reference vertical and frame timing signals, which are converted into digital information for processing by the microprocessor. The microprocessor also receives analog information shown by the block left of the microprocessor which is converted into digital information for processing by the microprocessor and such analog input signals include the automatic scan tracking error signals, the tension arm error signals and various signals related to motor currents of the reel drive motors, the capstan drive motor and the scanner drive motor. The data bus also receives operating mode information as well as other machine control data and it processes this information and provides status information and other data. The microprocessor generates digital information which is converted to analog information and these analog output signals include control signals for the capstan servo, the reel servo, the head scanner servo and the automatic scan tracking servo. Similarly, the microprocessor provides frequency, phase and timing output information which include delay signals, phase and timing output information that are used by the various servos and other circuits of the apparatus.

The microprocessor controlled system of the present invention has a unique advantage in that it is adaptable for recording and reproducing video signals from any standard worldwide format, i.e., it can record and reproduce a NTSC signal having 525 lines of a PAL or SECAM signal having 625 horizontal lines. The input control line can be set to operate either as a 525 or 625 line system and the various constants and other software values which control the servos and other circuitry of the apparatus will be selected for proper operation. Similarly, another control line can be set for either a PAL or SECAM format system once a 625 line system is specified. The software in memory includes instructions and numerical constants that will permit the apparatus to properly operate regardless of the television signal format that is selected.

In accordance with an aspect of the present apparatus, the microprocessor controlled servo system described herein is adapted to control the reel servo system and the head scanner servo system during the high speed shuttle mode in a way so as to protect the recording and reproducing heads, while the tape is being wound off one of the reels onto the other. In the past, as the tape was nearing the end so as to be wound on a single reel during high speed shuttle, the potential for chipping the ceramic recording and reproducing heads was quite high. In accordance with an aspect of the apparatus described herein, during high speed shuttle, reel tape pack diameter information that is determined by the microprocessor is used to control the reel servo and the scanning head servo to perform a sequence of events which substantially reduce if not eliminate the possibility of heads being chipped. When the microprocessor determines that the tape has almost reached the end of being wound off one reel, it controls the reel servo to stop the tape and it also reverses head scanner motor current to brake the rotation of the heads. After the tape has been stopped, the reel servo moves the tape at a relatively slow rate, e.g., twice normal recording speed, and the rotating head assembly is allowed to coast while the tape is wound entirely off of one reel on to the other.

Figure 3A:
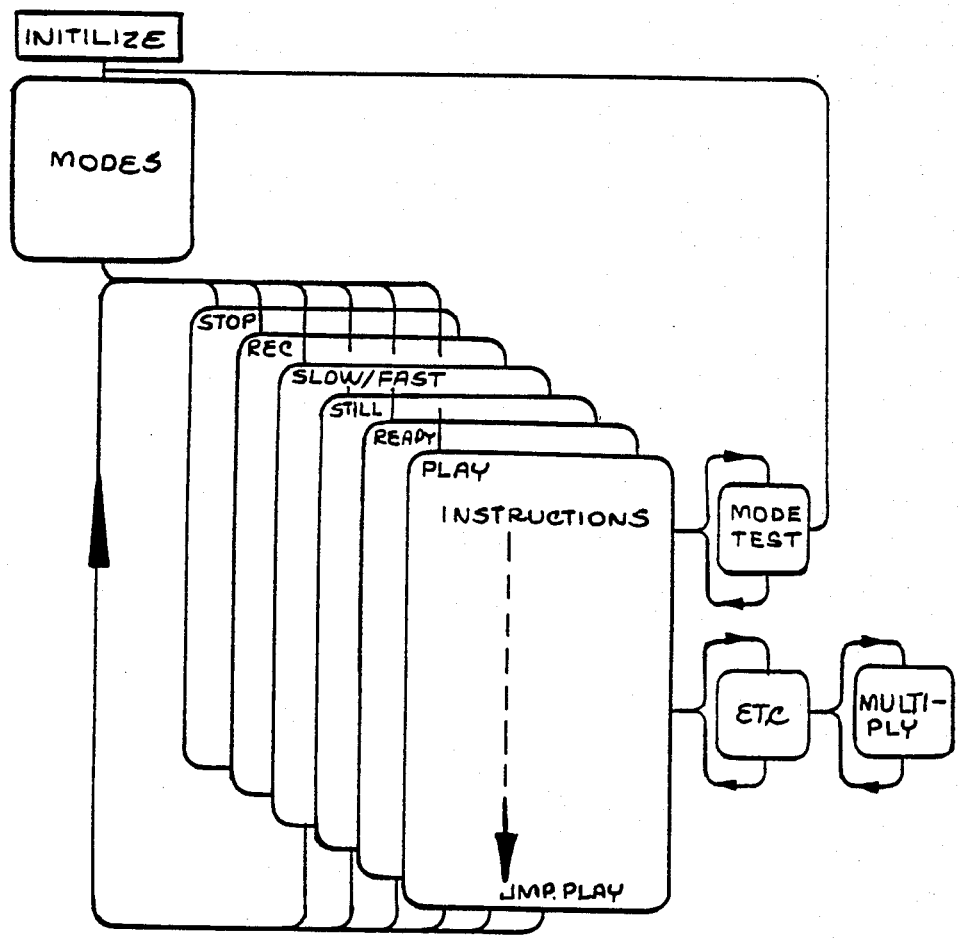
FIGS. 3a and 3b are very broad flow charts illustrating the software functional operation of the microprocessor.
Figure 3B:
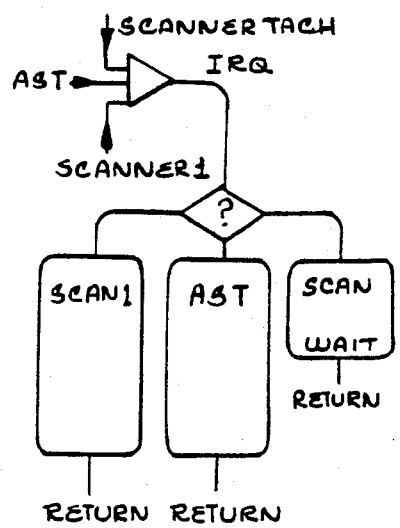

The apparatus is programmed to operate in various operating modes as is shown in the broad flow chart of FIG. 3a. The flow charts representing microprocessor software shows that once the machine is initialized, a mode is selected and these modes include stop, record, slow motion reproduce, stop motion or still frame reproduce, ready and normal play. Once the apparatus is placed in an operating mode, then it undergoes a mode test to determine if it is a valid mode and if such is the case, it will return to that mode and begin running the program that controls the apparatus in that mode. If the mode test is invalid, then it will return to the stop mode and the apparatus will stop. After the apparatus is placed in a valid mode, it will continue in that mode until some event occurs, such as a mode change or a completion of some operation. Included as part of each operating mode are various subroutines which are called as shown in FIG. 3a. Certain ones of these subroutines are used in various ones of the operating modes. For example, the play mode will contain a block of code instructions that will call up various subroutines in the specified order. As long as the apparatus is operating in the play mode it will repetitively go through this block of code instructions. When the head scanner tachometer pulse occurs, it will cause an interrupt to the microprocessor as shown in FIG. 3b.

The microprocessor operates on an interrupt basis, with an interrupt resulting from one of the three inputs. The software determines which input caused the interrupt and the microprocessor then enters the appropriate block of code which runs through various subroutines until it reaches the end and then returns to the instruction that had previously been completed prior to the interrupt. The scanner tachometer pulse originally triggered a counter which has a count that exceeds the maximum time required to store all current relevant information in stack registers in the microprocessor. When this is done, it is ready to immediately perform the instructions in the scanner 1 block of code. This is carried out by the scanner interrupt block of code which causes the microprocessor to store the information and then literally wait for the scanner 1 interrupt. After the scanner 1 block of code is run, the microprocessor removes the information from the stack registers and resumes running through the instructions specified by the operating mode.

Figure 4:
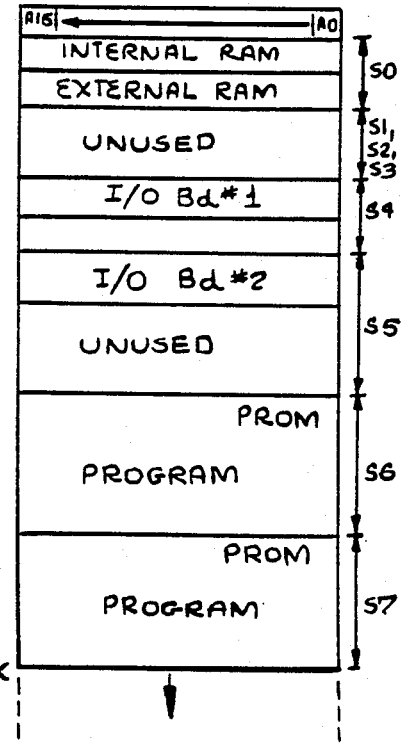
FIG. 4 is a map illustrating the manner in which the software instructions are located within the associated microprocessor memories.

Complete software for operating the microprocessor for controlling all of the servos and other operations shown in the block diagrams of FIGS. 1, 2, 3a and 3b is contained in the computer code listings attached hereto as Appendix A. The program is written in a clear and concise manner to minimize the amount of memory that is required to perform the various operations. In this regard, FIG. 4 illustrates a memory map having 32,000 memory locations. As is shown in FIG. 1, the entire circuitry for the various servos and other operations are contained in two printed circuit boards with the upper first board containing most servos and the microprocessor itself and the second board containing the automatic scan tracking servo, reference generator, tape sync processor and time base corrector interface circuitry. In the memory map shown in FIG. 4, the program is written to utilize various portions of the 32K memory and the memory is segregated into eight separate 4K sections S0–S7 which are decoded by address bits 12 through 14 which are used to place memory instructions in certain areas of the memory. For example, the address area $S_4$ is used to identify the input/output circuitry of the first board and area $S_5$ identifies a 4K section of memory wherein instructions relating to the operation of input/output portion of the second board are contained. Sections $S_1$, $S_2$ and $S_3$ are shown to be decoded but are not used during operation of the apparatus. Thus, from the illustration of FIG. 4 it should be appreciated that the entire operation of all of the servos and other operations shown in the block diagram of FIGS. 1 and 2 are carried out utilizing less than 4K of program. The operation of the capstan servo system will now be broadly described on a functional level, followed by a more detailed description of the servo as well as other portions of the microprocessor controlled system.

BROAD CAPSTAN SERVO DESCRIPTION

Figure 5:
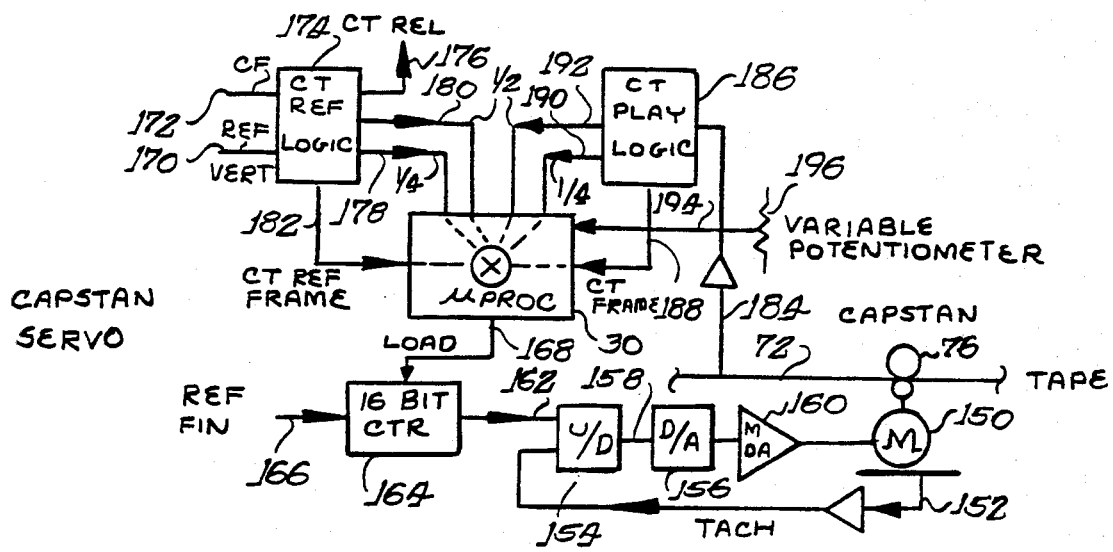
FIG. 5 is a functional block diagram of the capstan servo system.

Turning now to an important aspect of the present invention, the capstan servo is illustrated by the functional block diagram of FIG. 5. The capstan servo functional block diagram illustrates that the transport of the tape 72 is controlled by the capstan 76 which has a drive motor 150 with an associated tachometer, the tachometer providing tachometer pulses on line 152 for use in an inner servo loop. The tachometer signal is applied to an up/down counter 154, the output of which is applied to a digital-to-analog converter 156 via line 158 and its output is fed to a motor drive amplifier 160 that controls the motor 150. The up/down counter 154 also has an input line 162 extending from the output of a 16-bit counter 164 which has a reference frequency a 4 MHz signal applied thereto via line 166. The counter essentially controls the frequency of the reference signal that is applied to the up/down counter through its output line 162. The microprocessor 30 loads a number into the counter via line 168 which determines the output frequency on line 162. Varying the number that is loaded into the counter 164 changes the division function to thereby vary the output reference signal frequency and thereby vary the speed of the capstan. The upper left hand portion of the block diagram illustrates the control track reference logic system, which has inputs comprising the reference vertical information via line 170, the color framing information via line 172. These signals enable logic circuitry 174 to generate a control track record signal on line 176, ¼ frame and ½ frame rate signals on lines 178 and 180 and a control track reference frame signal on line 182, which latter three signals are applied to and used by the microprocessor 30 as shown. On the right side is a similar circuit which utilizes control track playback signal information from line 184 obtained from the tape during reproducing. Control track play logic circuitry 186 provides a control track frame rate signal on line 188, ¼ frame and ½ frame rate signals on lines 190 and 192, which signals are also applied to the microprocessor. The microprocessor determines from these signals whether the recorder must perform a color frame match operation. If the apparatus is operating as a 525 line NTSC recording and reproducing apparatus, it will color frame match using the ½ frame rate signal and if it is operating as a 624 line PAL or SECAM system, it will color frame match using the ¼ frame rate signal. The control track play logic therefore is adapted to control the tape so that proper color framing is achieved during normal reproduce operations.

There is also an input line 194 to the microprocessor which applies a signal from a variable control potentiometer 196 on the front panel of the recorder which controls the capstan and therefore the tape speed. The variable control signal is converted from analog to digital form for use by the microprocessor, which could be done by the analog-to-digital converter shown in FIGS. 6A and 6B if desired. The digital variable control signal is applied to the microprocessor which then applies a corresponding digital word to the counter 164 for controlling the speed. As will be hereinafter described, the control is nonlinearized and programmable to provide nonlinear control of capstant speed as a function of the potentiometer position and the actual tape speed. In other words, most of the possible rotational movement of the potentiometer will control the speed in the range from 1/30 of the normal play speed to ½ of the normal play speed and a small amount of the rotation of the potentiometer will control the speed from ½ of the normal play speed to normal speed and fast motion. This permits the range of actual rotation of the potentiometer to be most fully utilized in the range of speed where more accurate control is desired. Since it is programmable, it desirably places the vernier control of the capstan drive, and hence tape speed, where it is most appropriately used. The nonlinear control of the capstan drive through the potentiometer 196 enables the operator to exercise more effective control of the tape transport through observation of the display of the information reproduced from the tape, particularly during slow motion operating mode.

Additionally, when there is a change between one very slow slow motion speed and another slightly faster slow motion speed, and it is changed from one to another, the microprocessor is programmed to change rapidly between the two speeds. However, when the speed is approaching normal speed, then the actual change from one speed to another will be made more slowly. The transport handles these differences in the change at the various speeds more easily, but also as the picture is viewed, rapid changes that occur during extremely slow slow motion playback are more comfortable to a viewer than rapid changes that occur during slow motion speeds that approach normal speed reproducing.

The Microprocessor Circuitry

Figure 6B:
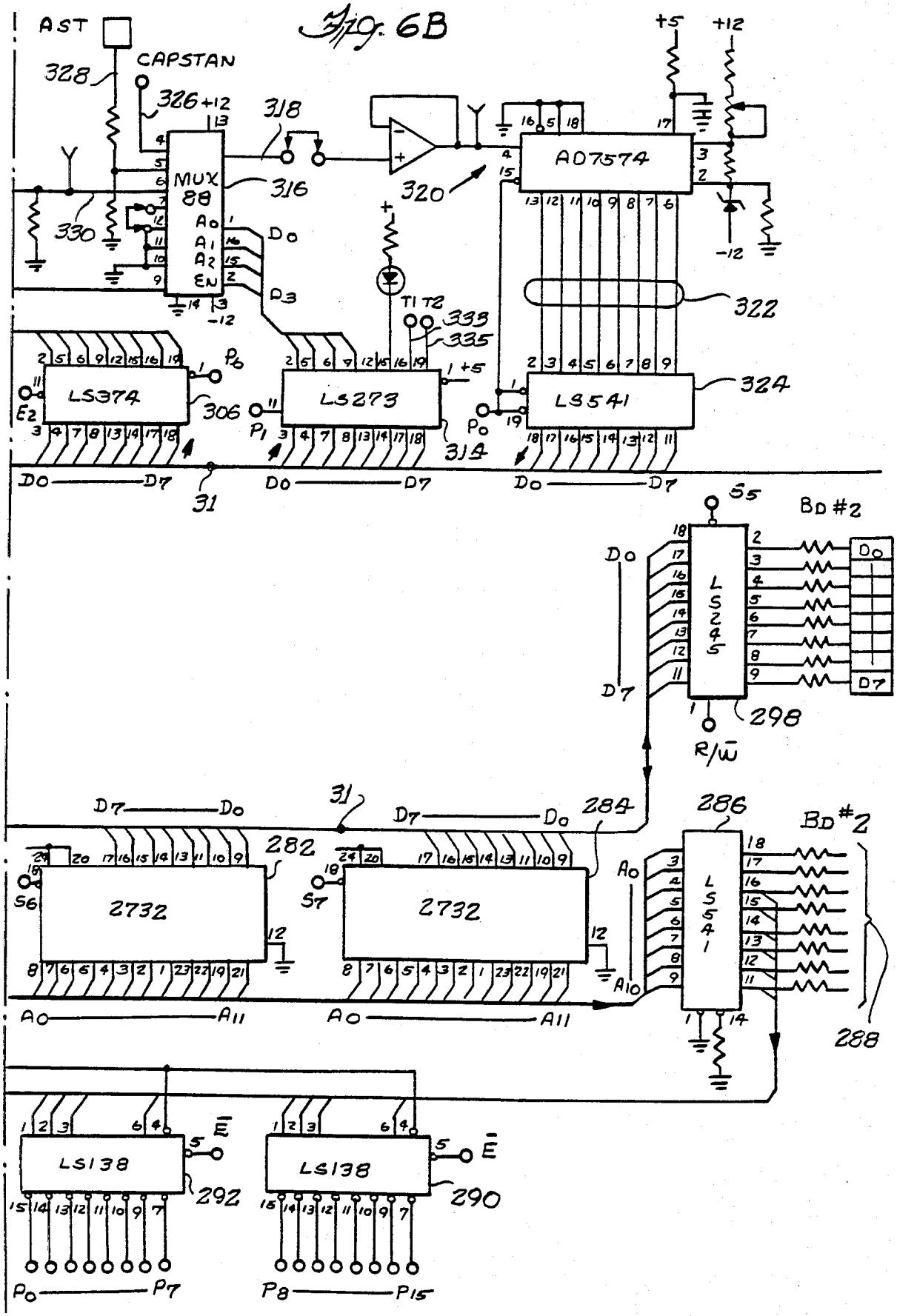

Before describing the detailed electrical circuit schematic diagrams of the capstan servo previously described with respect to functional block diagram of FIG. 5, the schematic diagrams which contain the microprocessor 30 itself will be briefly described in connection with FIGS. 6A and 6B which together comprises a single schematic. As previously mentioned, and as has been shown by the block diagram of FIG. 1, the bulk of the circuitry of the apparatus described herein is contained on only two printed circuit boards and one of said printed circuit boards contains the microprocessor itself. The layout of the circuitry is such that address control of bidirectional buffers enable the data bus from the microprocessor to be connected to either the first or the second printed circuit board. As shown in FIG. 6A, the microprocessor 30, which is a Motorola integrated circuit Model MC 6802 has 16 address lines which address circuit components as well as specific addresses of memory circuits. As shown on the lower portion of the microprocessor 30 in FIG. 6A, address lines $A_0$ through $A_{15}$ extend rightwardly to a random access memory 280 which is controlled by address lines $A_0$ through $A_7$, as well as respective programmable read only memories 282 and 284 (FIG. 6B) which are controlled by address liines $A_0$ through $A_{11}$. The address lines also extend to a buffer 287 which has output lines indicated generally at 288 which extend to the second printed circuit board address lines. The lines 288 also extend downwardly to respective decoder integrated circuits 290 and 292 which are used to select ports $P_0$ through $P_{15}$. The address lines also extend to yet another decoder 294 which provides selection of various programmable timer integrated circuits $T_A$ through $T_H$.

Decoders 290, 292 and 294 are enabled when a master decode enable line $S_4$ is active and this is provided by a master decode circuit 296 located to the left of the decoder 294. As is clearly illustrated, address lines $A_{12}$, $A_{13}$ and $A_{14}$ from the microprocessor 30 control the address selection master decode enable output lines $S_0$ through $S_7$ that activate various portions of the circuiry. For example, when active the decoded output line $S_0$ enables the random access memory 280, decode output $S_6$ enables the memory 282 and decode output $S_7$ similarly enables memory 284. The data bus 31 from the microprocessor comprises eight output lines $D_0$ through $D_7$ extending to the memories 280, 282, 284 as well as to bidirectional buffers 298 and 300. Buffer 290 has output lines that extend the data bus to the second printed circuit board, and it is activated by the decode output $S_5$. Activation of the decode output $S_4$ enables the decoders 290, 292 and 294 as well as the other bidirectional buffer 300 which effectively extends the data bus to the remaining circuitry shown in the upper portion of FIGS. 6A and 6B and to remaining circuitry on board No. 1.

As shown in FIG. 6A, the data bus 31 has input latches 302 and 304 connected thereto and an output latch 306 being shown in FIG. 6B. The data lines 308 are also connected to these latches and the lines 308 represent a data bus to the machine control system which has a separate microprocessor controlled system for carrying out other machine control functions of the apparatus independently of the system controlled by microprocessor 30. The interaction of operator control and mode switches, diagnostics and the like with the servo system of the present invention is carried out through this data bus via the latches 302, 304 and 306. These latches are respectively enabled by enable lines $E_0$, $E_1$ and $E_2$ which are decoded outputs of a decoder circuit 310 that has operator activated address lines $A_0$ through $A_3$ from the machine control system. The decoder circuit 310 is enabled by a line 312 from the machine control system. By selectively enabling decode output lines $E_0$, $E_1$ and $E_2$, data can be input into the latches 302 and 304 for communication onto the data bus of the microprocessor 30 and enabling the latch 306 permits data from the microprocessor 30 to be latched therein for communication to the machine control system via lines 308.

The remaining portion of the circuitry shown in the upper portion of FIGS. 6A and 6B concern the analog information input that is provided to the microprocessor 30. When port $P_1$ from decoder 292 is active, a latch 314 that is connected to the data bus can receive a data word which decodes an address for controlling a multiplexing switch 316. The switch 316 selects one of the left inputs thereof for application onto line 318 that extends to an analog-to-digital converter, indicated generally at 320, having output lines 322 which extend to a latch 324 which applies data onto the data bus for use by the microprocessor when a port line $P_0$ is enabled from the address decoder 292.

The multiplexing switch 316 can select a capstan servo control track error signal applied via line 326, an automatic scan tracking movable element position error signal applied via line 328 or a signal that is indicative of the position of the tension arm 70 applied via line 330. The circuitry at the upper portion of FIG. 6A provides an analog signal on line 330 that represents the position of the previously described tension arm through appropriate loop compensation circuitry indicated generally at 331. The arm positional reference for forward and reverse arm locations during shuttle and still frame reproducing is set by coding lines 333 and 335 by means of the output latch 314 from the microprocessor. In addition, line 337 can be selected to measure the actual mechanical arm position for tape threading and unthreading.

Figure 8:
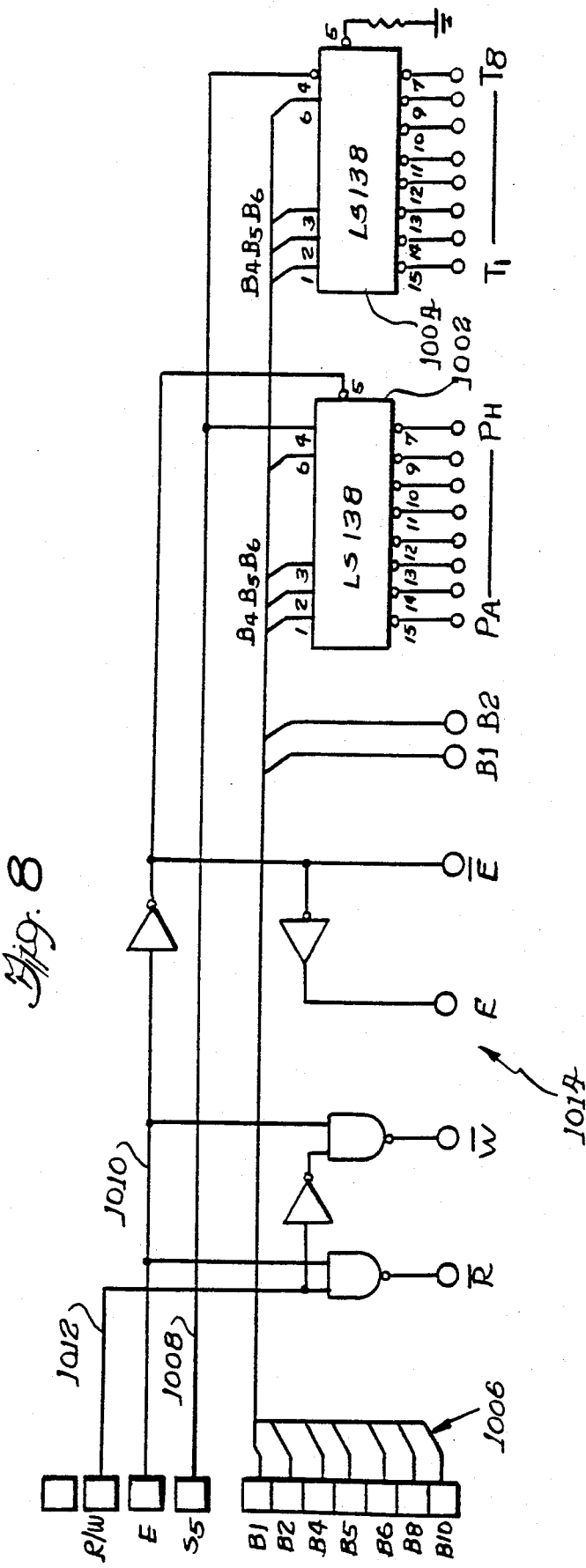
FIG. 8 is a detailed electrical schematic diagram of board decode circuitry of the apparatus embodying the present invention; and, FIG. 9 illustrates several graphs of the transfer function for the capstan servo, particularly illustrating the nonlinear transfer function of the variable speed potentiometer control and the resulting capstan speed.

Two sets of port and timer circuit decoders are employed in the preferred apparatus of the invention. One set has been previously described with reference to FIGS. 6A and 6B, namely port decoders 290 and 292 (FIG. 6B) and timer circuit decoder 294 (FIG. 6A). FIG. 8 illustrates the second set of decoders comprising port decoder 1002 and timer circuit decoder 1004. The first set of decoders illustrated in FIGS. 6A and 6B respond to selected ones of the address signals A0–A15 issued by the microprocessor 30, selected ones of the master enabling signals S0–S7 issued by decoder 296 and system clock signal E to enable selectively ports and timer circuits of the machine communication circuitry 38, scanner servo 36, capstan servo 34 and reel servo 38 (FIG. 1). The second set of decoders illustrated in FIG. 8 similarly function to issue selectively port enabling signals (decoder 1002) and timer circuit enabling signils (decoder 1004) to the reference generator 40, the AST servo 44, tape sync processor 46 and TBC interface 50 (FIG. 1). More specifically, the second set of decoders receives buffered address signals over lines 1006 from the buffers 286 (FIG. 6B). These address signals together with master decode select signal 85 received over line 1008 from the master decoder 296 (FIG. 6A) and the system clock signal E received from the microprocessor 30 over line 1010 enable the decoders 1002 and 1004 to issue the port timer circuit enabling signals according to the functions being performed by the apparatus as determined by the operator manipulated controls and the controlling microprocessor software. In addition, the second set of decoders receives a read/write command W from the microprocessor 30 (FIG. 6A) over line 1012 and, through logic 1014 comprising NAND gates and inverters, generates retimed read command $\overline{R}$, write command $\overline{W}$ and oppositely phased master clock signals E and $\overline{E}$. These signals are employed together with the port and timer circuit enable signals to control the operation of aforementioned reference generator 40, AST servo 44, tape sync processor 46 and TBC interface 50.

THE CAPSTAN SERVO CIRCUITRY

Figure 7A:
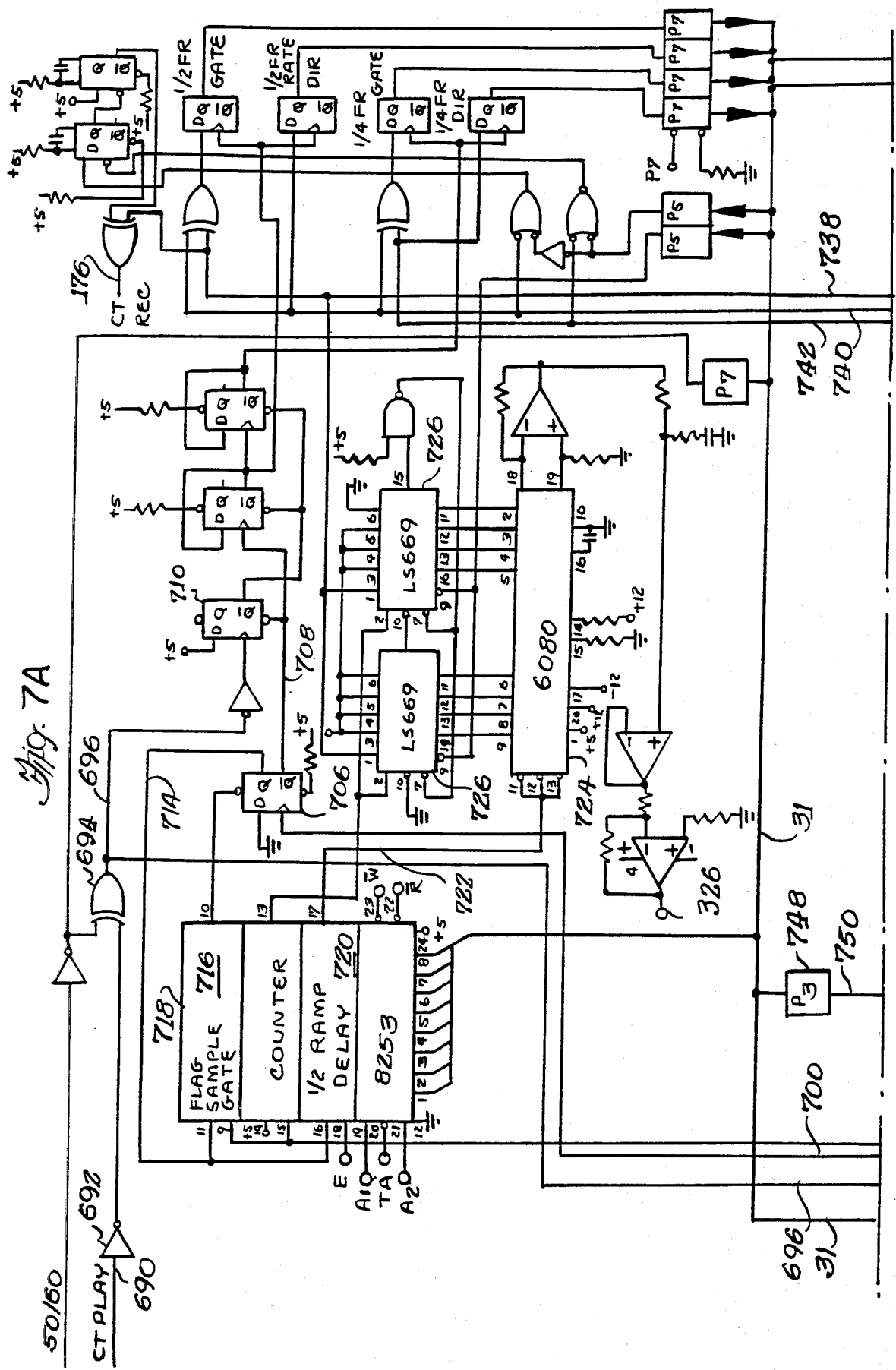

The capstan servo described in the block diagram of FIG. 5 is carried out by the detailed circuitry shown in FIGS. 7A and 7B. The capstan tachometer signal is applied on line 650 (FIG. 7B) which extends to a D latch which is part of the quad D latch integrated circuit 642 and the reference input frequency signal is applied via line 644. The latches are clocked by the microprocessor output clock E via line 646 and this clock also clocks an up/down counter 648, the output of which is applied to a digital-to-analog converter 650 which provides an analog output signal to the drive amplifier circuitry, indicated generally at 652. The circuitry includes a high gain section 654 and a low gain section 656 and a switching circuit 658 controlled by the microprocessor to either provide a high or low gain error signal. Line 660, controlled by the microprocessor, controls the switching circuit 658 to either apply the high gain signal from the upper circuitry 654 or the low gain signal from the lower circuitry 656 through the switcher onto line 662 which results in the capstan error signal being produced at the output line 664.

The circuitry shown in FIG. 7B effectively compares the phase of the reference on line 644 with the phase of the capstan tachometer on line 640 and provides a capstan servo error signal to control the precise speed of the capstan. The illustrated circuitry has the advantage that it does not suffer from common problems that can cause a servo system to run away in that it is incapable of doing so because of the absence of any capstan direction sensitivity or any upper or lower speed limits. The circuitry provides an analog output which achieves a phase lock without excessive overshoot and eliminates the possibility of reverse run away, even if the control variable rate, i.e., the capstan tachometer, exceeds the reference rate in the reverse direction. More specifically, common prior art capstan servos can run away in two different ways. The first can occur if the polarity of the feedback is reversed from that defined according to the normal capstan direction without a corresponding reversal of the generated error. The second way in which the capstan can run away occurs when the up-/down counter is permitted to roll-over when the count limit conditions are reached. The present circuitry automatically overcomes these problems by virtue of the fact that it automatically compensates for the capstan direction or error changes.

The circuitry uses the fully synchronous up/down binary counter 648 and appropriate gating to enable the counter and to control an up/down control line 666. The reference input and tachometer inputs are automatically guided to increment or decrement the counter 648 in accordance with the direction lines. The output of the D latches for the capstan tachometer line 640 is applied to a NAND gate 688 and the reference signal is gated through the D latch and it is connected to an EXCLUSIVE OR gate 670. The NAND gate 668 provides a low output for every positive transition of the capstan tachometer pulse and this low output signal has a duration of one clock period. The reference signal that is applied through the D latch to the EXCLUSIVE OR gate 670 produces a low signal for every transition of the reference signal and this low signal also lasts for one clock period. The output from the EXCLUSIVE OR 670 is applied to an inverter 672, as well as to one input of another EXCLUSIVE OR gate 674, with the output of the inverter 672 being applied to a NAND gate 676. The NAND gate 668 output is applied to an inverter 678, as well as to the other input of the EXCLUSIVE OR gate 674. The output of the inverter 678 is applied to one input of a NAND gate 680 and the outputs of NAND gates 680 and 676 are applied to NAND gate 682, the output of which extends via an inverter 684 and line 666 to the up/down control of the up/down counter 648. The output of the EXCLUSIVE OR gate 674 is applied through an inverter 686 and line 688 to the enable the input of the up/down counter 648.

The operation of the logic circuitry is effective to control the up/down control line 666 so as to change the digital value of the counter in the proper direction to reduce the error. If the system contains no error, then the reference and capstan tachometer signals will be coincident and in such event, low outputs will be produced by the NAND gate 668 as well as the EXCLUSIVE OR gate 670 and both inputs will cause the EXCLUSIVE OR gate 674 to disable the up/down counter so that it will neither be incremented or decremented by the clock. If only one of the gates 668 or 670 is active, then the logic circuitry wll cause the up/down line to be controlled at the proper signal level so as to either increment or decrement the counter in the correct direction to reduce the error. The gate 680 also has one input supplied by a capstan forward and reverse control line 689 which automatically steers the logic to control the up/down control line so as to reduce the error regardless of the direction the capstan is being driven.

In accordance with another aspect of the capstan servo, the recorded control track information is used in the conventional manner and this operation is also accomplished under microprocessor control. As shown in FIG. 7A, the control track signal on input line 690 is applied through inverter 692 and EXCLUSIVE OR gate 694, whose output appears on line 696 which extends downwardly to an AND gate 698 (FIG. 7B) that has its output line 700 applied to the input of a one-shot multivibrator 702 that is part of programmable timer chip 704. Line 700 also extends to clock a D flip-flop 706 (FIG. 7A) which has a $\overline{Q}$ output line 708 that clears a flip-flop 710 that provides a playback flag. The freewheeling one-shot 702 has output line 712 that extends to the other input of the AND gate 698 and the AND gate and one-shot operate to block any spurious control track signals that may be present on line 696 until shortly before the control track pulse is expected to occur, at which time the free-wheeling one-shot changes state to enable the legitimate control track pulse to be applied and be gated through the AND gate 698 and again trigger the one-shot 702. In the event that a control track pulse is not present, then the change of state of the free-wheeling one-shot 702 timing out will similarly cause an output signal on line 712 and the AND gate will provide a clock signal on line 700 to flip-flop 706 in the same manner as would an actual control track pulse. The only difference is that it will be slightly advanced relative to when it should occur which will cause a slight drift in the rate of the control track, but will not be of sufficient magnitude to create any significant problem during the time that control track is not present. An output line 714 from flip-flop 706 is applied to the input of a flag sample gate counter 716 of a programmable timer chip 718 as well as a ½ ramp delay one-shot 720, the latter of which provides an output on line 722 which triggers a digital-to-analog converter 724 which samples the value of up/down counter 726 which contains the digital values of the control track signal. The ½ ramp delay 720 effectively causes the digital-to-analog converter 724 to sample the value of the counter 726 at the mid-point of the frame signal and properly times the control track playback signal. Stated in other words, the digital-to-analog converter 724 is triggered by the ½ ramp delay 720 so that the control track sample which is delayed from the actual control track by ½ ramp delay results in the actual control track and the actual reference being in phase.

The capstan servo circuitry programmable timer chip 704 (FIG. 7A) has a reference vertical input signal on line 730 which is applied to a tracking one-shot 732. During reproducing, the tracking one-shot is programmed to directly follow the reference vertical and apply a pulse on output line 734 which is applied to a counter divider 736 that in turn provides various output signals, such as a frame rate signal on line 738, a ½ frame rate signal on line 740, and a ¼ frame rate signal on line 742. During normal operation, the frame signals will be synchronized to reference vertical and is phase adjustable by operation of the control track phase control.

In accordance with an important aspect of the present apparatus, a very significant functionally desirable capability is possible by virtue of the programmable timer chip 704 and particularly the tracking one-shot 732 therein in that it can be reprogrammed to operate as a rate generator and provide an output that varies slightly relative to the input reference. Thus, the output signal on line 734 may be one count in 40,000 counts different relative to the reference vertical or any other difference can be programmed by the microprocessor so that a definite time compression or expansion of the reproduction can be obtained if desired. This would permit an entire program to be speeded up or slowed down to fit the time slot that is desired and it can be done without removing any particular segment of the program. All that needs to be done is to reprogram the tracking one-shot section of the timer chip 704 to provide a time difference that will result in either a time expansion or compression of the program and all of the program content will still be present during reproducing.

It should be appreciated that when a video tape is recorded on one apparatus and is played back on another, there is an interchange problem which can create time variations that are greatly in excess of the difference that may be programmed into the tracking one-shot. Therefore, to insure that the program will be actually expanded or compressed by the desired amount, it is necessary that the apparatus still maintain control track lock of the capstan servo. When such is done, then the rate generator operation from the tracking one-shot will effectively perform the time expansion or contraction that is programmed into the apparatus as is desired.

To accomplish the asynchronous playback that has been described, reference is made of FIG. 7B which has the reference vertical signal applied via input line 730 as previously described. During normal playback, the output of the one-shot 732 provides a delay time that is a function of a control track phase adjustment potentiometer which is located on the front panel of the apparatus and which is a part of the operator controlled machine control system. The output from the tracking one-shot 732 appears on line 734 to the divider 736 and the frame output on line 738 is used to control the up/down line of the counter 726 shown in FIG. 7A. The value of the counter is latched into the digital-to-analog converter 724 by the control track playback frame pulse on line 722 which thereby generates a control track error voltage that appears at the output of the digital-to-analog converter 724 and which ultimately results in a signal at output line 326 that is one of the inputs to the analog-to-digital converter circuit 320 shown in FIG. 6B. The circuitry of FIG. 6B converts the analog value to an 8-bit word that is applied to the microprocessor 30 through the multiplexed analog-to-digital converter 320 shown in FIG. 6A. The microprocessor converts the data to a 16-bit word which it applies to an inner loop reference counter 744 (FIG. 7B) which clocks a D flip-flop 746 that operates as a divide-by-two and provides the reference input signal on line 644 which closes the control track servo loop.

When the apparatus is operating in the asynchronous playback mode, the microprocessor 30 is programmed to write a high signal to a latch 748 which has an output line 750 that extends to gates 752 and 754 (FIG. 7B). The high signal on line 750 effectively disables the loading operations that would occur in the divider 736 and it additionally forces the input to the tracking one-shot 732 high to enable it to begin counting. The tracking one-shot is thereby changed to be a rate generator that produces an output vertical reference frequency that is programmable by the microprocessor. Since the input to the counter 732 is the studio reference clock frequency, the output can be programmed to be different from the normal reference vertical by the expression F input clock/Normal count±F input clock/Programmed count The programmed count can be derived from a local or a remote source. It should be appreciated that since the tape will be moving at a speed that is slightly different from the normal record or reproduce speed to accomplish the desired time compression or expansion, the automatic scan tracking head will occasionally be requied to make a track jump. For this reason, the automatic scan tracking servo and time base corrector operation is switched from normal play to variable play so that the desired track jumps can be carried out.

As has been previously described with the block diagram of the capstan servo shown in FIG. 5, the variable potentiometer 196 for controlling the slow motion reproducing of the apparatus provides an, analog potentiometer signal, which is converted into an 8-bit word that is applied to the microprocessor. The microprocessor 31 then processes the 8-bit data word to provide a nonlinear function for the purpose of accomplishing the desired feel of the apparatus in terms of the speed of response as a function of the amount of arcuate movement of the potentiometer which is also a function of the speed at which the capstan is being driven. This operation can be more readily appreciated from FIG. 9a which shows a transfer function of the speed versus the processed input data word from the potentiometer 196. As has been described with respect to FIG. 5, the microprocessor loads a 16-bit word into counter 164 via load lines 168 (which in actuality is the data bus 31) which in FIG. 7B, comprises the inner loop reference counter 744 of the timer chip 704. By changing the 16-bit number that is applied to the counter, a different output value on line 162 is applied to the up/down counter 154 which effectively changes the speed of the capstan by virtue of the inner loop control.

Figure 9:
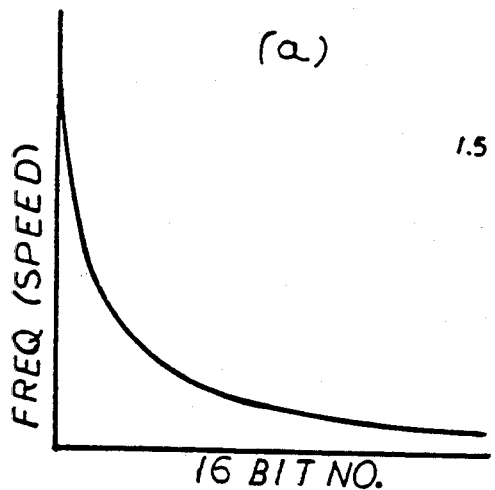
Figure 9:
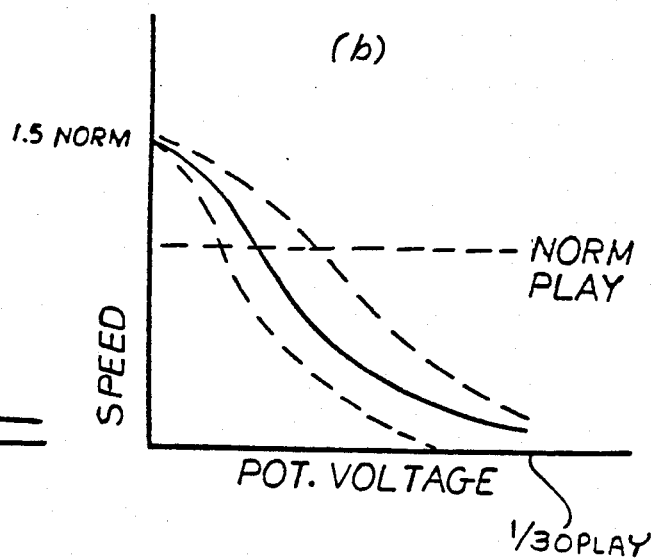
Figure 9:
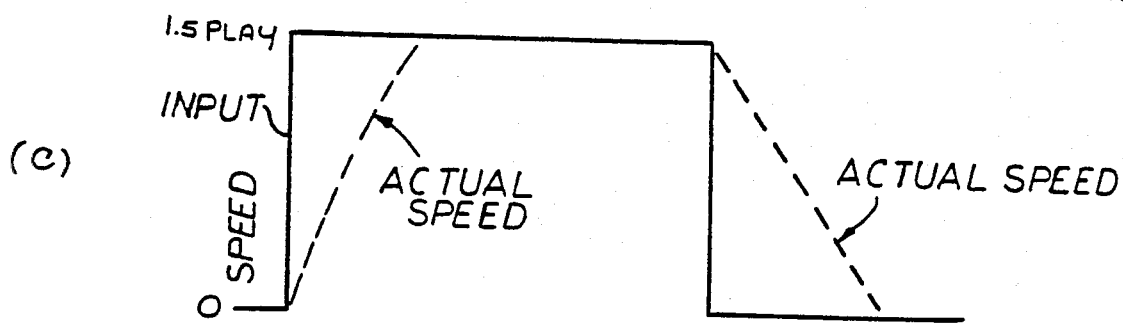
Figure 9:
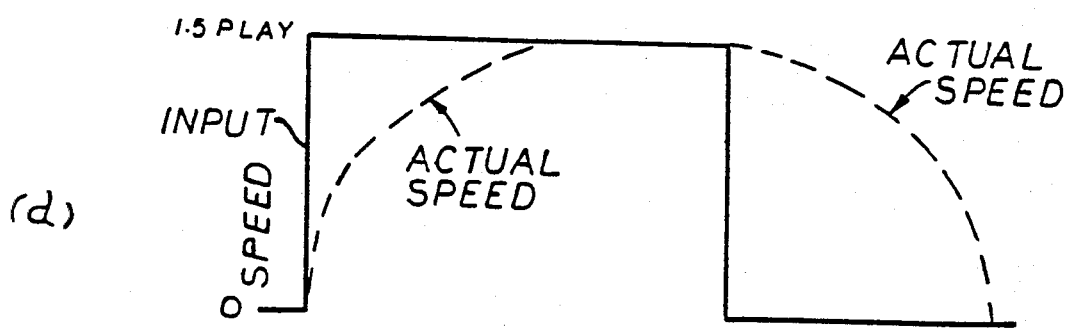

While the microprocessor receives an 8-bit word, it performs a multiplication function to obtain the 16-bit word which is applied to the counter 164. The result is the nonlinear transfer function as shown in FIG. 9a wherein the speed increases as the value of the 16-bit number decreases. The output speed is inversely proportional to the value of the number applied to the counter. The transfer function shown in FIG. 9a is undesirable for the reason that it does not provide the desirable feel to an operator for controlling the speed during the variable motion reproducing.

When the unit is operating at very slow speeds, a two unit angular change of the potentiometer may result in a one percent change in the reproducing speed and there therefore is no significant stepped speed change involved in making the two unit anngular change of the potentiometer. However, when the apparatus is reproducing at higher speeds, i.e., close to normal reproducing speed or faster than normal speeds, a two unit angular change in the setting of the potentiometer may result in a 20 percent change in the output frequency which can make a very pronounced and stepped speed change in the image being viewed.

Accordingly, it is desired to change the shape of the transfer function in a manner shown in FIG. 9b and this is accomplished by further processing the 8-bit word beyond a mere multiplication. This is accomplished by multiplying the 8-bit word by the function $K+(8\text{-bit word}/255)^3$. This results in the representation shown by the solid line of FIG. 9b. The microprocessor also limits the minimum number that can be provided to the counter so as to limit the output speed at 1½ times the normal reproducing speed. The curve of FIG. 9b then is shaped to provide smaller increments of actual speed change per unit change of the position of the potentiometer until it reduces to below normal play speed whereupon changes of values of the potentiometer more rapidly change the speed in the slower speeds. The dotted representations on each side of the solid representation show possible variations in the function that can be accomplished by varying the expression. The number 225 diviser of the function is intended to maintain the 16-bit word within the limits of zero and 64,000, the range of the 16-bit counter. If the ultimate multiplication result was greater than 64,000, then a discontinuity in the curve could result which would be extremely undesirable.

In accordance with another aspect of the nonlinearization of the slow motion variable potentiometer control, the viewer is much more able to observe the visual effects of the rate of change of the variable motion image at high speeds than at low speeds. Stated in other words, at very slow slow motion speeds, for example, in the range of 1/30 to 1/15 of normal speed, changes between one speed and another can be done rapidly without providing any disturbing visual effect to an observer. However, at high speeds, e.g., a change of from normal to 1½ times normal speed cannot be done rapidly without providing a significant disturbing effect on a viewer. Therefore, it is desirable to make changes between speeds at high speed more slowly than is done during changes at slow slow motion speeds. Such variation is also accomplished by the apparatus of the present invention and this is illustrated by FIGS. 9c and 9d. In FIG. 9c, an instantaneous change in the potentiometer from zero to 1½ times the normal play speed, e.g., the input line shown by the solid representation of FIG. 9c results in an actual response time to accomplish the speed change that is shown by the dotted representation. Similarly, if the speed is instantaneously changed from 1½ times play speed down to zero as shown in the right of FIG. 9c, the actual speed will ramp down as shown by that dotted representation.

The present apparatus desirably varies the response, effectively delaying it when the speed is operating close to normal speed and above. This is accomplished by inserting a time delay into the response wherein the amount of delay provided is a function of the actual speed that the tape is moving. The speed that is required dictates a certain 16-bit number that is applied to the counter 164 and this number is compared with the actual speed in order to increment or decrement the count that is to be applied to the counter. If the actual speed is one that is in the range of the normal playback speed or faster, then as increased time delay will be provided in reaching the required number so that the rate of change of speed will be decreased as the actual speed is increased. This is shown in FIG. 9d wherein the actual speed response to an instantaneous change from zero to 1½ times play shows a response that rises rapidly, i.e., very little delay in the early portion thereof and then increased amounts of delay are inserted so that the rate of change of speed is decreased as the actual speed increases. When the speed is instantaneously changed from 1½ times normal to zero, the actual speed change is delayed to change more slowly from the higher speeds and changes more rapidly at the slower speeds.

CONCLUSION

From the foregoing detailed description, it should be appreciated that an improved nonlinear control for the capstan servo has been shown and described which provides desirable feel to an operator who is controlling the apparatus for slow motion as well as fast motion reproducing effects. The manner in which the nonlinearity is provided enables the operator to accurately control the speed of the visual image during variable motion reproducing and to change between one variable speed and another in a way which does not provide a visually disturbing image to the viewer.

It should be understood that although preferred embodiments of the present invention have been illustrated and described, various modifications thereof will become apparent to those skilled in the art; and, accordingly, the scope of the present invention should be defined only by the appended claims and equivalents thereof.

Various features of the invention are set forth in the following claims.

```
                   374    ORG   17FF8H     ;INTERRUPT VECTOR      6081 B74150
7FFB  7322         375    FDB   IRQRT      ;INTERRUPT ROUTINE.    6084 8L8B
                   376    ORG   17FFCH     ;NMI VECTOR            6086 9722
7FFC  7341         377    FDB   SCANNER    ;SCANNER ROUTINE.      6088 B7411B
                   378    ORG   17FFEH     ;RESET VECTOR          608B B695
7FFE  6101         379    FDB   INTLIZE    ;INITIALIZE ROUTINE    608D 9741
                   381    ;......                                 608F B61E
6101  8F           392    INTLIZE                                 6091 9732
6001  CE1000                                                      6093 B63C
6004  B655                                                        6095 9731
6006  A780                                                        6097 B608
6008  8B                                                          6099 9703
6009  BC0100                                                      609B 9733
600C  26F8                                                        609D 8694
600E  CE0000                                                      609F 973E
6011  A100                                                        60A1 CEB050
```

```
6013 2622
6015 0B
6016 BC0100
6019 26F6
601B CE0000
601E B6AA
6020 A700
6022 0B
6023 BC0100
6026 26F8
6028 CE0000
602B A700
602D 2608
602F 08
6030 BC0100
6033 26F6
6035 2009
6037 B6BF
6039 972E
603B B74160
603E 20C0
6040 CE0000
6043 C601
6045 B680
6047 6F00
6049 0B
604A 4A
604B 26FA
604D C501
604F 2706
6051 8680
6053 5F
6054 7E6047
6057 8E00FF
605A 8680
605C B74130
605F 97A1
6061 B74210
6064 B74220
6067 B74240
606A B74250
606D 971A
606F B75150
6072 B75160
6075 85FF
6077 9712
6079 9720
607B 9721
607D B69F
607F 972E
6112 B634
6114 B7444C
6117 B67A
6119 B74446
611C B6BA
611E B74446
6121 CEFFFF
6124 FF4442
6127 CEFFFF
612A FF4444
612D B634
612F B74456
6132 B674
6134 B74456
6137 B6B8
```

```
619F CE0004
61A2 FF5414
61A5 8C32
61A7 B75426
61AA 8672
61AC B75426
61AF B6BA
61B1 B75426
61B4 8632
61B6 B75436
61B9 B672
61BB B75436
61BE 86B2
61C0 B75436
```

```
6227 B75476
622A B6B4
622C B75476
622F CE4000
6232 FF5472
6235 B64176
6238 8580
623A 2603
623C 7E6315
623F CE1027
6242 FF4410
6245 DF61
6247 CEA04D
624A DF7F
```

```
62AD DF53
62B0 CEE002
62B3 DF55
62B5 CE2001
62B8 DF57
62BA CE4000
62BD DF59
62BF CEC003
62C2 DF5B
62C4 CE8000
62C7 FF5450
62CA CE9804
62CD FF5462
62D0 DF5D
```

```
632D DF65
6330 CE000A
6333 FF4424
6336 CE6004
6339 DF47
633B CE6004
633E DF49
6340 CE0120
6343 FF4430
6346 DF4B
6348 CE6842
634B FF4432
634E CE0500
6351 FF4440
```

```
63B3 CE0601
63B6 FF5470
63B9 FF5474
63BC B61E
63BE 970E
63C0 B74150
63C3 CED804
63C6 DF0F
63C8 CC5804
63CB DF1C
63CD B63C
63CF 9763
63D1 B607
63D3 9764
63D5 B621
```

```
60A4 DF3F
60A6 86C6
60A8 9725
60AA B75100
60AD 864A
60AF 9702
60B1 B75110
60B4 9799
60B6 CE007F
60B9 DFA4

60BB B63A
60BD B74406
60C0 B674
60C2 B74406
60C5 86BA
60C7 B74406
60CA CE2602
60CD FF4400
60D0 CE0800
60D3 FF4402
60D6 CE0004
60D9 FF4404

60DC B63A
60DE B74416
60E1 B674
60E3 B74416
60E6 B6B2
60E8 B74416
60EB CEFFFF
60EE FF4412
60F1 DFA9

60F3 B632
60F5 B74426
60F8 B670
60FA B74426
60FD B6B4
60FF B74426
6102 CE8000
6105 FF4420

6108 B632
610A B74436
610D B672
610F B74436
```

| | | | | | | |
|---|---|---|---|---|---|---|
| 6139 B74456 | 61C3 CE0003 | 624C CE8890 | 62D2 CE4C02 | | 63D7 972A | |
| 613C CEFFFF | 61C6 FF5430 | 624F FF4414 | 62D5 DF5F | 6354 CE267F | 63D9 8676 | |
| 613F FF4450 | 61C9 CEC002 | | 62D7 CE9804 | 6357 FF5408 | 63DB 9790 | |
| 6142 CEFFFF | 61CC FF5434 | 6252 CE704E | 62DA FF5464 | 635A CE4083 | 63DD 8690 | |
| 6145 FF4452 | | 6255 FF4422 | | 635D FF5402 | 63DF 979E | |
| 6148 CEFFFF | 61CF B632 | 6258 DF65 | 62DD CE3301 | | 63E1 CE7480 | |
| 614B FF4454 | 61D1 B75446 | 625A CE000A | 62E0 FF5470 | 6361 CEA53E | 63E4 DF16 | |
| | 61D4 8672 | 625D FF4424 | 62E3 FF5474 | 6363 FF5420 | 63E6 DF3B | |
| 614E 8634 | 61D6 B75446 | 6260 CE9804 | | 6366 CE8040 | 63E8 960E | |
| 6151 B74466 | 61D9 86B2 | 6263 DF47 | 62E6 B69E | 6369 FF5422 | 63EA B4E3 | |
| 6153 B674 | 61DB B75446 | 6265 CE9804 | 62E8 970E | 636C CEEE00 | 63EC 970E | |
| 6155 B74466 | 61DE CE0300 | 6268 DF49 | 62EA B74150 | 636F FF5424 | 63EE B74150 | |
| 6158 86B8 | 61E1 FF5440 | | 62ED CEE304 | 6372 DF4D | 63F1 BA1C | |
| 615A B74466 | 61E4 CE3000 | 626A CE6125 | 62F0 DF0F | 6374 CE4E00 | 63F3 970E | |
| 615D CEFFFF | 61E7 FF5442 | 626D FF4430 | 62F2 CE6304 | 6377 DF4F | 63F5 B74150 | |
| 6161 FF4460 | 61EA CE3000 | 6270 DF4B | 62F5 DF1C | 6379 CE8E01 | | |
| 6163 CEFFFF | 61ED FF5444 | 6272 CE204E | 62F7 8657 | 637C DF51 | | |
| 6166 FF4462 | | 6275 FF4432 | 62F9 9763 | | | |
| 6169 CEFFFF | 61F0 863A | | 62FB 8607 | 637E CE9801 | | |
| 616C FF4464 | 61F2 B75456 | 6278 CE0600 | 62FD 9764 | 6381 FF5432 | 63F8 0E | |
| | 61F5 8672 | 627B FF4440 | 62FF 8627 | 6384 DF53 | 63F9 B64120 | |
| 616F B632 | 61F7 B75456 | | 6301 972A | 6386 CE3002 | 63FC 9124 | |
| 6171 B75406 | 61FA 86B6 | 627C CE289B | 6303 B68D | 6389 DF55 | 63FE 270E | |
| 6174 8674 | 61FC B75456 | 6281 FF5430 | 6305 9790 | 638B CEF000 | | |
| 6176 B75406 | 61FF CE0500 | 6284 CE409C | 6307 86AB | 638E DF57 | 6400 9724 | |
| 6179 86B2 | 6202 FF5452 | 6287 FF5402 | 6309 979E | 6390 CE5000 | 6402 962E | |
| 617B B75406 | 6205 CE4000 | | 630B CE7460 | 6393 DF59 | 6404 BA1F | |
| 617E CEFF08 | 6208 FF5454 | 628A CE2C4B | 630E DF16 | 6395 CED002 | 6406 972E | |
| 6181 FF5404 | | 628D FF5420 | 6310 DF3B | 6398 DF5B | 6408 B74160 | |
| | 6201 8636 | 6290 CEA04C | 6312 7E63E8 | | 640B 7E631F | |
| 6184 8632 | 620D B75466 | 6293 FF5422 | | 639A CE8008 | 640E 5F | |
| 6188 B75416 | 6210 8674 | 6296 CE7E01 | 6315 CED020 | 639D FF5450 | 640F 8111 | |
| 6189 8674 | 6212 B75466 | 6299 FF5424 | 6318 FF4410 | | 6411 2416 | |
| 618B B75416 | 6215 86B4 | 629C DF4D | 631B DF61 | 63A0 CE6004 | 6413 48 | |
| 618E 86BA | 6217 B75466 | 629E CE9E00 | 631D CE2041 | 63A3 FF5462 | 6414 C900 | |
| 6191 B75416 | 621A CE4005 | 62A1 DF4F | 6320 DF9F | 63A6 DF5D | 6416 CE6435 | |
| 6193 CE7800 | 621D FF5460 | 62A3 CE5E02 | 6322 CE3075 | 63A8 CE3002 | 6419 DF00 | |
| 6196 FF5410 | | 62A6 DF51 | 6325 FF4414 | 63AB DF5F | 641B 9B01 | |
| 6199 CE0400 | 6220 8634 | | | 63AD CE6004 | 641D 9701 | |
| 619C FF5412 | 6222 B75476 | 62A8 CE0802 | 6328 CE0942 | 63B0 FF5464 | 641F D900 | |
| | 6225 8672 | 62AB FF5432 | 632B FF4422 | | 6421 D700 | |

| | | | | | | |
|---|---|---|---|---|---|---|
| 6423 DE0C | 649D 7E648C | 6521 7E6547 | 659F BD721A | 6620 27D4 | 669D B64100 | |
| 6425 EE00 | 64A0 C653 | 6524 B680 | 65A2 7E658B | 6622 9698 | 66A0 B64110 | |
| 6427 6E00 | 64A2 BD71A4 | 6526 7E6519 | 65A5 D61A | 6624 8137 | 66A3 B64120 | |
| 6429 962E | 64A5 BD7000 | 6529 9621 | 65A7 CB08 | 6626 25EB | 66A6 B64130 | |
| 642B BA9F | 64A8 BD7279 | 652B 8A10 | 65A9 D7C5 | 6628 9632 | 66A9 B64140 | |
| 642D 972E | 64AB 9621 | 652D 9721 | 65AB 9105 | 662A 8B74 | 66AC B64150 | |
| 642F B74160 | 64AD BA01 | 652F 7E6547 | 65AD 2503 | 662C 971A | 66AF B64160 | |
| 6432 7E6987 | 64AF 9721 | 6532 9621 | 65AF 7E6587 | 662E 9622 | 66B2 B64170 | |
| | 64B1 8C86 | 6534 B4EF | 65B2 17 | 6630 D635 | 66B5 B64200 | |
| 6435 6457 | 64B3 97A6 | 6536 9721 | 65B3 7E6587 | 6632 D114 | 66B8 B64210 | |
| 6437 645A | 64B5 7E648C | 6539 7E6547 | 65B6 C658 | 6634 2239 | 66BB B64220 | |
| 6439 64B8 | | 653B D621 | 65B8 D167 | 6636 D636 | 66BE B64230 | |
| 643B 64C9 | 64B8 BD71AF | | 65BA 2405 | 6638 2635 | 66C1 B64240 | |
| 643D 64E9 | 64BB 962E | 653D C510 | 65BC 8678 | 663A C08A | 66C4 B64250 | |
| 643F 65CA | 64BD 8486 | 653F 27D4 | 65BE 7E6587 | 663C D714 | 66C7 B64260 | |
| 6441 669A | 64BF 8A02 | 6541 9631 | | 663E BAC0 | 66CA B64270 | |
| 6443 66EF | 64C1 972E | 6543 B137 | 65C1 D621 | 6640 9722 | 66CD B65100 | |
| 6445 66FC | 64C3 B74160 | 6545 25EB | 65C3 C4FB | 6642 B74110 | 66D0 B65110 | |
| 6447 683E | 64C6 7E648C | 6547 8678 | 65C5 D721 | 6645 D621 | 66D3 B65120 | |
| 6449 68C8 | | 6549 971A | 65C7 7E6580 | 6647 C501 | 66D6 B65130 | |
| 644B 68DF | 64C9 BD70AF | 654B 9622 | | 6649 2638 | 66D9 B65140 | |
| 644D 696F | 64CC 5A | 654D 84C0 | 65CA BD70AF | 664B 9611 | 66DC B65150 | |
| 644F 6987 | 64CD F74210 | 654F 8140 | 65CD 9612 | 664D B74250 | 66DF B65160 | |
| | | 6551 2706 | 65CF 8502 | | | |

| | | | | | |
|---|---|---|---|---|---|
| 6451 6A0C | 64D0 F74220 | 6553 9621 | 65D1 270F | 6650 B1F7 | 66E2 B65170 |
| 6453 6A1E | 64D3 F74240 | 6555 BA14 | 65D3 BD710A | 6652 2425 | 66E5 B686 |
| 6455 6A3A | 64D6 F74250 | 6557 9721 | 65D6 BD71D2 | 6654 B108 | 66E7 972E |
| | 64D9 F75160 | 6559 9622 | 65D9 9620 | 6656 2526 | 66E9 B74160 |
| 6457 7E645A | 64DC F75150 | 655B B47F | 65DB 8502 | 6658 BD72BB | 66EC 7E669A |
| | 64DF B683 | 655D 8A40 | 65DD 2703 | 665B F64260 | |
| 645A BD70AF | 64E1 972E | 655F 9722 | 65DF 7E65CA | 665E C501 | 66EF BD70AF |
| 645D BD71D2 | 64E3 B74160 | 6561 B74110 | 65E2 C637 | 6660 2727 | 66F2 B607 |
| 6460 9612 | 64E6 7E64C9 | 6564 D621 | 65E4 BD71A4 | 6662 B74240 | 66F4 972E |
| 6462 8502 | | 6566 C501 | 65E7 BD7000 | 6665 B605 | 66F6 B74160 |
| 6464 270C | 64E9 BD70AF | 6568 2635 | 65EA B64140 | 6667 972E | 66F9 7E66EF |
| 6466 BD710A | 64EC 9612 | 656A 9611 | 65ED 9123 | 6669 B74160 | |
| 6469 9620 | 64EE 8502 | 656C B74250 | 65EF 272B | 666C 7E65CA | 66FC BD70AF |
| 646B 8502 | 64F0 271F | 656F B117 | 65F1 9723 | 666F BA3F | 66FF BD71D2 |
| 646D 2703 | 64F2 BD710A | 6571 2422 | 65F3 7E65E2 | 6671 BA80 | 6702 9612 |
| 646F 7E645A | 64F5 BD71D2 | 6573 8120 | 65F6 8180 | 6673 C601 | 6704 8502 |
| 6472 9620 | 64F8 9620 | 6575 2523 | 65F8 250B | 6675 D714 | 6706 270C |
| 6474 8520 | 64FA 8502 | 6577 BD72BB | 65FA 9723 | 6677 20C7 | 6708 BD710A |
| 6476 2728 | 64FC 2703 | 657A D621 | 65FC 9698 | 6679 86FF | 670B 9620 |
| 6478 C6B3 | 64FE 7E64E9 | 657C C504 | 65FE B13C | 667B 7E6662 | 670D 8502 |
| 647A BD71A4 | 6501 C637 | 657E 2636 | 6600 2408 | 667E 8600 | 670F 2703 |
| 647D BD7000 | 6503 BD71A4 | 6580 F64260 | 6602 7E6628 | 6680 7E6662 | 6711 7E6832 |
| 6480 D621 | 6506 BD7000 | 6583 C501 | 6605 B680 | 66B3 BD721A | 6714 D621 |
| 6482 C501 | 6509 B64140 | 6585 261E | 6607 7E65FA | 6686 7E6665 | 6716 C501 |
| 64B4 2614 | 650C 9123 | 6587 43 | 660A 9621 | 6689 D61A | 6718 2648 |
| 64B6 BD73C5 | 650E 272B | 6588 B74240 | 660C BA20 | 668B CB1B | 671A BD730E |
| 6489 B74250 | 6511 9723 | 658B B604 | 660E 9721 | 668D D705 | 671D B74250 |
| 648C 962E | 6512 7E6501 | 658D 972E | 6611 7E6620 | 668F 9105 | 6721 8636 |
| 648E B480 | 6515 8180 | 658F B74163 | 6613 9621 | 6691 2503 | 6722 9109 |
| 6490 8A01 | 6517 250B | 6592 7E64E9 | 6615 B4DF | 6693 7E6662 | 6724 2742 |
| 6492 972E | 6519 9723 | 6595 B600 | 6617 9721 | 6696 17 | 6726 960E |
| 6494 B74160 | 651B 9631 | 6597 7E6587 | 6619 7E6628 | 6697 7E6662 | 6728 B4FC |
| 6497 7E645A | 651D 813C | 659A 86FF | 661C D621 | | 672A BA40 |
| 649A BD721A | 651F 2408 | 659C 7E6507 | 661E C520 | 669A BD70AF | 672C 970E |

| | | | | | |
|---|---|---|---|---|---|
| 672E B74150 | 67AF DE14 | 6828 DE14 | 68A5 2715 | 6927 CE10FF | 69A9 B74150 |
| 6731 8640 | 67B1 FF4410 | 682A FF4412 | 68A7 960E | 692A 19 | 69AC 9612 |
| 6733 972D | 67B4 9631 | 682D DFA9 | 68A9 B4FD | 692B 26FD | 69AE BA03 |
| 6735 C6B3 | 67B6 8501 | 682F 7E6779 | 68AB BA40 | 692D BD70E2 | 69B0 9712 |
| 6737 BD7000 | 67B8 26E0 | 6832 962E | 68AD 970E | 6931 7E6959 | 69B2 B6FF |
| 673A 7A0003 | 67BA C693 | 6834 BA1F | 68AF B74150 | 6933 BD721A | 69B4 B74220 |
| 673D 2703 | 67BC BD7000 | 6836 972E | 68B2 B609 | 6936 7E6959 | 69B7 B680 |
| 673F 7E6832 | 67BF D630 | 6838 B74160 | 68B4 972E | 6939 DEA9 | 69B9 B74210 |
| 6742 8636 | 67C1 C502 | 683B 7E66FC | 68B6 B74160 | 693B 9C0F | 69BC B65140 |
| 6744 900B | 67C3 273E | | 68B9 7E683E | 693D 2603 | 69BF 8540 |
| 6746 2406 | 67C5 B64170 | 683E BD70AF | 68BC 960E | 693F 7E6965 | 69C1 273A |
| 6748 7A000B | 67C8 C504 | 6841 BD71D2 | 68BE B42C | 6942 DE0F | 69C3 8580 |
| 674B 7A000B | 67CA 2613 | 6844 9612 | 68C0 970E | 6944 FF4412 | 69C5 2731 |
| 674E 7C0908 | 67CC 43 | 6846 8502 | 68C2 B74150 | 6947 DFA9 | 69C7 C65B |
| 6751 D60B | 67CD B387 | 6848 270C | 68C5 7E68B2 | 6949 DE61 | 69C9 D702 |
| 6753 53 | 67CF 8580 | 684A BD710A | | 694B FF4413 | 69CB F75110 |
| 6754 54 | 67D1 2613 | 684D 9620 | 68C8 BD70AF | 694E 960E | 69CE D799 |
| 6755 54 | 67D3 8540 | 684F 8502 | 68CB B64140 | 6950 B4FE | 69D0 86B0 |
| 6756 54 | 67D5 271D | 6851 2703 | 68CE 919A | 6952 BA42 | 69D2 B75466 |
| 6757 54 | 67D7 8520 | 6853 7E683E | 68D0 2704 | 6954 970E | 69D5 8689 |
| 6758 54 | 67D9 2713 | 6856 D621 | 68D2 979A | 6956 B74150 | 69D7 B75160 |
| 6759 5C | 67DB CE1F05 | 6858 C501 | 68D4 20F2 | 6959 962E | 69DA DE53 |
| 675A D703 | 67DE FF4412 | 685A 2617 | 68D6 B60A | 695B BA1F | 69DC FF5432 |
| 675C BD70E2 | 67E1 DFA9 | 685C BD730B | 68D8 972E | 695D 972E | 69DF DE4D |
| 675F 7E66FC | 67E3 7E6779 | 685F B74250 | 68DA B74160 | 695F B74160 | 69E1 FF5424 |
| 6762 BD721A | 67E6 8508 | 6862 C6B3 | 68DD 20E9 | 6962 7E68DF | 69E4 BD703D |
| 6765 7E6832 | 67E8 27E9 | 6864 BD7000 | | 6965 B60B | 69E7 BD7279 |
| 6768 DE0F | 67EA B510 | 6867 B64140 | 68DF BD70AF | 6967 972E | 69EA 962E |
| 676A FF4412 | 67EC 26ED | 686A 9123 | 68E2 C653 | 6969 B74160 | 69EC B480 |

| | | | | | |
|---|---|---|---|---|---|
| 676D DFA9 | 67EE CE9F04 | 686C 270B | 68E4 BD7000 | 696C 7E68DF | 69EE 8A0D |
| 676F CE01FF | 67F1 7E67DE | 686E 9723 | 68E7 BD720C | | 69F1 972E |
| 6772 DF03 | 67F4 DE1E | 6870 7E6856 | 68EA 9612 | 696F BD70AF | 69F2 B74160 |
| 6774 CE13F6 | 67F6 2705 | 6873 BD721A | 68EC 8502 | 6972 C653 | 69F5 7E6987 |
| 6777 DF1E | 67F8 09 | 6876 7E68B2 | 68EE 270F | 6974 BD7000 | 69F8 C673 |
| 6779 BD71D2 | 67F9 DF1E | 6879 970C | 68F0 BD710A | 6977 BD7305 | 69FA 7E69FF |
| 677C 9612 | 67FB 2006 | 687B 960C | 68F3 BD720C | 697A B74250 | 69FD C6F3 |
| 677E 8502 | 67FD 9630 | 687D 970B | 68F6 9620 | 697D 850C | 69FF D762 |
| 6780 2703 | 67FF B4FD | 687F 2720 | 68F8 8502 | 697F 972E | 6A01 F75110 |
| 6782 7E66FC | 6801 9730 | 6881 7A0003 | 68FA 2703 | 6981 B74160 | 6A04 D799 |
| 6785 BD730B | 6803 DE03 | 6884 261B | 68FC 7E6759 | 6984 7E696F | 6A06 BD7000 |
| 6788 B74250 | 6805 2705 | 6886 900B | 68FF D621 | | 6A09 7E69DA |
| 678B BD70AF | 6807 09 | 6888 2406 | 6901 C501 | 6987 BD70AF | |
| 678E B64140 | 6808 DF03 | 688A 7A000B | 6903 262E | 698A 9621 | 6A0C BD70AF |
| 6791 9123 | 680A 2010 | 688D 7A000B | 6905 BD730B | 698C 8A01 | 6A0F B64140 |
| 6793 2709 | 680C 960E | 6891 7C000B | 6908 B74250 | 698E 04FD | 6A12 972F |
| 6795 9723 | 680E 8A03 | 6893 D60B | 690B 960E | 6990 7721 | 6A14 869E |
| 6797 7E678B | 6810 970C | 6895 53 | 690D 84FC | 6992 9620 | 6A16 972E |
| 679A C653 | 6812 B74150 | 6896 54 | 690F 8A40 | 6994 BA1F | 6A18 B74160 |
| 679C 201E | 6815 B618 | 6897 54 | 6911 970E | 6996 9721 | 6A1B 7E6A0C |
| 679E 9705 | 6817 972E | 6898 54 | 6913 B74150 | 6998 8680 | |
| 67A0 8640 | 6819 B74160 | 6899 54 | 6916 960B | 699A 97A6 | 6A1E BD70AF |
| 67A2 9706 | 681C C600 | 689A 54 | 6918 8136 | 699C 960E | 6A21 B64140 |
| 67A4 BD70CE | 681E 961B | 689B 5C | 691A 271D | 699E B4AE | 6A24 9130 |
| 67A7 CB80 | 6820 9B1C | 689C D703 | 691C 2406 | 69A0 970E | 6A26 2704 |
| 67A9 B90C | 6822 9714 | 689E BD70E2 | 691E 7C000B | 69A2 B74150 | 6A28 9730 |
| 67AB 9715 | 6824 D91D | 68A1 961B | 6921 7C000B | 69A5 8A36 | 6A2A 20F2 |
| 67AD D714 | 6826 D715 | 68A3 81FF | 6924 7A000D | 69A7 970E | 6A2C 962E |
| 6A2E 8480 | 702F 9621 | 70A3 8680 | 710A 9620 | 7125 B74250 | 71F5 9766 |
| 6A30 8A0F | 7031 8A80 | 70A5 B75160 | 710C 8501 | 7189 86FF | 71F7 BD70CE |
| 6A32 972E | 7033 9721 | 70A8 9621 | 710E 2738 | 718B B74220 | 71FA DB4B |
| 6A34 B74160 | 7035 B65140 | 70AA 847F | 7110 8510 | 718E 9712 | 71FC 994C |
| 6A37 7E6A1E | 7038 8580 | 70AC 9721 | 7112 2725 | 7190 962E | 71FE 80C4 |
| | 703A 2701 | 70AE 39 | 7114 960E | 7192 B4DF | 7200 D739 |
| 6A3A BD79AF | 703C 39 | | 7116 84DF | 7194 BAC0 | 7202 973A |
| 6A3D C653 | 703D B65140 | 70AF B64120 | 7118 B74150 | 7196 972E | 7204 0F |
| 6A3F BD7000 | 7040 841F | 70B2 9124 | 711B 97CE | 7198 B74160 | 7205 DE39 |
| 6A42 BD720C | 7042 9705 | 70B4 2717 | 711D CE1E00 | 719B 962C | 7207 FF4430 |
| 6A45 DEA9 | 7044 8620 | 70B6 D621 | 7120 DFAB | 719D 84F7 | 720A 0E |
| 6A47 9C0F | 7046 9706 | 70B8 C502 | 7122 9612 | 719F 8A16 | 720B 39 |
| 6A49 2707 | 7048 BD76CE | 70BA 261C | 7124 8501 | 71A1 9720 | 720C 9630 |
| 6A4B DE0F | 704B CB40 | 70BC 8680 | 7126 2716 | 71A3 39 | 720E 8501 |
| 6A4D FF4412 | 704D 890C | 70BE B74240 | 7128 8680 | | 7210 26C6 |
| 6A50 DFA9 | 704F D743 | 70C1 B74250 | 712A B74210 | 71A4 960B | 7212 0F |
| 6A52 D621 | 7051 9744 | 70C4 CA02 | 712D 8040 | 71A6 81FF | 7213 DE4B |
| 6A54 C501 | 7053 39 | 70C6 D721 | 712F B74220 | 71A8 2612 | 7215 FF4430 |
| 6A56 2610 | 7054 9621 | 70C8 33 | 7132 9620 | 71AA DE1E | 7218 0E |
| 6A58 BD730B | 7056 8580 | 70C9 33 | 7134 84FE | 71AC 2620 | 7219 39 |
| 6A5B B74250 | 7058 2601 | 70CA 7E63F8 | 7136 9720 | 71AE 960E | |
| 6A5E B610 | 705A 39 | 70CD 39 | 7138 39 | 71B0 B4BE | 721A 962E |
| 6A60 972E | 705B B6BC | | 7139 CE01FF | 71B2 8A02 | 721C 847F |
| 6A62 B74160 | 705D B75466 | 70CE 4F | 713C 20E2 | 71B4 970E | 721E 972E |
| 6A65 7E6A3A | 7060 B680 | 70CF 5F | 713E 8680 | 71B6 B74150 | 7220 B74160 |
| 6A68 BD721A | 7062 B75160 | 70D0 CE00CB | 7140 B74210 | 71B9 C4F7 | 7223 C694 |
| 6A6B 7E6A5E | 7065 C680 | 70D3 58 | 7143 86FF | 71BB 39 | 7225 D73E |
| | 7067 86A0 | 70D4 49 | 7145 B74220 | 71BC 86FF | 7227 D667 |
| | 7069 B75160 | 70D5 7B00C5 | 7148 7E7132 | 71BE 970B | 7229 C1BC |
| | 706C 5A | 70D8 2404 | 714B 9620 | 71C0 CEFFFF | 722B 2406 |
| | 706D C100 | 70DA DB06 | 714D B50B | 71C3 FF4412 | 722D D621 |
| | 706F 26FB | 70DC 8930 | 714F 271D | 71C6 DFA9 | 722F C4FE |
| | 7071 8670 | 70DE 09 | 7151 8510 | 71C8 CE0030 | 7231 D721 |
| 7001 0F | 7073 B75160 | 70DF 25F2 | 7153 2711 | 71CB DF1E | 7233 8682 |
| 7001 9630 | 7076 5C | 70E1 39 | 7155 8502 | 71CD 39 | 7235 B74240 |
| 7003 8501 | 7077 C100 | | 7157 2600 | 71CE 09 | 7238 96A6 |
| 7005 2702 | 7079 26FB | 70E2 960B | 7159 8514 | 71CF DF1E | 723A DEA4 |
| 7007 CA40 | 707B 8688 | 70E4 97C5 | 715B 2709 | 71D1 39 | 723C 09 |
| 7009 8520 | 707D B75160 | 70E6 9706 | 715D 84FD | | 723D 2604 |
| 700B 2614 | 7080 5A | 70E8 BD70CE | 715F 9720 | 71D2 9630 | 723F 4C |

| | | | | | |
|---|---|---|---|---|---|
| 708D CA40 | 7081 C100 | 70EB 9705 | 7161 CE2CD4 | 71D4 B501 | 724! CE007F |
| 708F C4DB | 7083 26FB | 70ED D60D | 7164 2005 | 71D6 2711 | 7243 DFA4 |
| 7011 C47F | 7085 B57C | 70EF D706 | 7166 DEAR | 71D8 BD70CE | 7245 C680 |
| 7013 D702 | 7087 B75160 | 70F1 BD70CE | 7168 2704 | 71DB D69A | 7247 F74466 |
| 7015 D699 | 70BA 5C | 70F4 DB63 | 716A 19 | 71DD 54 | 724A FE4464 |
| 7017 C47F | 708B C180 | 70F6 9964 | 716B DFAB | 71DE 4F | 724D DFA2 |
| 7019 D799 | 708D 26FB | 70F8 2402 | 716D 39 | 71DF DB4B | 724F 7300A2 |
| 701B F75110 | 708F B682 | 70FA B6FF | 716E 960E | 71E1 994C | 7252 D6A2 |
| 701E 0E | 7091 B75160 | 70FC 44 | 7171 B4AE | 71E3 C143 | 7254 D1A7 |
| 701F 2033 | 7094 5A | 70FD 56 | 7172 B74150 | 71E5 B200 | 7256 2709 |
| 7021 B65130 | 7095 C100 | 70FE 9703 | 7175 971E | 71E7 2017 | 7258 D7A7 |
| 7024 B502 | 7097 26FB | 7100 D707 | 7177 BA3E | 71E9 5F | 725A 4A |
| 7026 27E9 | 7099 B67F | 7102 DE07 | 7179 B74150 | 71EA B64200 | 725B CEFFFF |
| 7028 C580 | 709B B75160 | 7104 FF4412 | 717C 970E | 71ED B41F | 725E FF4464 |
| 702A 27E5 | 709E 5C | 7107 DFA9 | 717E B38E | 71EF B301 | 7261 B1A0 |
| 702C D702 | 709F C100 | 7109 39 | 7180 B74210 | 71F1 9705 | 7263 240F |
| 702E 0E | 70A1 26FB | | 7183 B74240 | 71F3 B321 | 7265 B180 |
| 7267 2506 | 72D2 BD70CE | | 7338 BA08 | | 73B5 7E73DA |
| 7269 97A6 | 72D5 8100 | | 733A B74150 | | 73B8 B681 |
| 726B B7425C | 72D7 261D | | 733D 0E | | 73BA 972C |
| 726E 39 | 72D9 17 | | 733E 7E745A | | 73BC B640 |
| 726F B680 | 72DA 9D1A | | 7341 961E | 2000 SCANNER | 73BE D612 |
| 7271 7E7269 | 72DC 2518 | | 7343 B4E7 | | 73C0 CA13 |
| 7274 B6A0 | 72DE 39 | | 7345 B74150 | | 73C2 D712 |
| 7276 7E7269 | 72DF D619 | | 7348 BA10 | | 73C4 9727 |
| | 72E1 D018 | | 734A B74150 | | 73C6 9625 |
| 7279 9667 | 72E3 D705 | | 734D 979E | | 73C8 B520 |
| 727B 81D0 | 72E5 B61B | | 734F 0E | | 73CA 26E5 |
| 727D 2426 | 72E7 9706 | | 7350 3E | | 73CC 9612 |
| 727F B682 | 72E9 BD70CE | | 7351 3B | | 73CE B58F |
| 7281 B74240 | 72EC 8100 | | 7352 B640 | | 73D1 270B |
| 7284 962E | 72EE 2609 | | 7354 B74426 | | 73D2 B520 |
| 7286 847F | 72F0 961A | | 7357 B74436 | | 73D4 2614 |
| 7288 972E | 72F2 10 | | 735A FE4422 | | 73D6 D620 |
| 728A B74160 | 72F3 2504 | | 735D DF28 | | 73D8 2605 |
| 728D D63E | 72F5 39 | | 735F FE4432 | | 73DA B75110 |
| 728F 7A0014 | 72F6 B6FF | | 7362 DF26 | | 73DD 9799 |
| 7292 260B | 72F8 39 | | 7364 B64170 | | 73DF B6B4 |
| 7294 B671 | 72F9 B600 | | 7367 DE05 | | 73E1 B74426 |
| 7296 9714 | 72FB 39 | | 7369 FF4422 | | 73E4 DE47 |
| 7298 5A | 72FC D623 | | 736C 8502 | | 73E6 FF4424 |
| 7299 C175 | 72FE DB35 | | 736E 274B | | 73E9 DE49 |
| 729B 2402 | 7300 25F7 | | 7370 9629 | | 73EB FF4424 |
| 729D C675 | 7302 7E72F0 | | 7372 2711 | | 73EE B674 |
| 729F F74250 | | | 7374 B680 | | 73F1 B75466 |
| 72A2 D73E | 7305 9632 | | 7376 9726 | | 73F3 9612 |
| 72A4 39 | 7307 44 | | 7378 B6FF | | 73F5 B580 |
| 72A5 B680 | 7308 7E730F | | 737A D612 | | 73F7 2723 |
| 72A7 B74250 | 730B 9632 | | 737C C4FE | | 73F9 B65140 |
| 72AA B74240 | 730D BB0A | | 737E CA02 | | 73FC B540 |
| 72AD C694 | 730F BB80 | | 7380 D712 | | 73FE 2613 |
| 72AF D73E | 7311 B74240 | | 7382 7E73C4 | | 7400 7E741C |
| 72B1 962E | 7314 9622 | | 7385 9627 | | 7403 DE5F |
| 72B3 BA88 | 7316 843F | | 7387 B12A | | 7405 FF5462 |
| 72B5 972E | 7318 BA80 | | 7389 270E | | 7408 DE5D |
| 72B7 B74160 | 731A 9722 | | 738B 2407 | | 740A FF5462 |
| 72BA 39 | 731C B74110 | | 738D B680 | | 740D B5B4 |
| | 731F 9611 | | 738F 9726 | | 740F B75466 |
| | 7321 39 | | 7391 7E739E | | 7412 DE43 |
| | | | 7394 B6FF | | 7414 FF5464 |
| | | | 7396 7E738F | | 7417 DE5D |
| | | | 7399 9626 | | 7419 FF5464 |
| | | | 739B 7E73BF | | 741C DE3E |
| 72BB D635 | | | 739E 9628 | | 741E DF16 |
| 72BD D719 | | | 73A0 D612 | | 7421 9626 |
| 723F D636 | 7322 9622 | 1986 IRGRT | 73B2 C4FD | | 7422 B74210 |
| 72C1 2639 | 7324 972B | | | | |

| | | | | | | |
|---|---|---|---|---|---|---|
| 72C3 9623 | 7326 B64178 | | 73A4 D712 | | 7425 9627 | |
| 72C5 43 | 7329 8514 | | 73A6 D620 | | 7427 B74228 | |
| 72C6 9718 | 732B 2714 | | 73A8 CA0D | | 742A 9628 | |
| 72C8 9019 | 732D 8581 | | 73AA C4EF | | 742C 8581 | |
| 72CA 2513 | 732F 2721 | | 73AC D720 | | 742E 271E | |
| 72CC 9715 | 7331 960E | | 73AE 7E73C4 | | 7430 9625 | |
| 72CE 8698 | 7333 84F7 | | 73B1 9602 | | 7432 8A11 | |
| 72D0 9706 | 7335 B74150 | | 73B3 BA20 | | 7434 B75180 | |
| 7437 84FE | | | | | | |
| 7439 9725 | 74A4 BD76C4 | 752F 7C002D | 75B8 7E757B | | 7641 CE7478 | 7637 F75180 |
| 743B B75100 | 74A7 CE7482 | 7532 CE7496 | | | 7644 7E757B | 76BA 39 |
| 743E 960E | 74AA 7E757B | 7535 7E757B | 75BB BD7680 | | | 76BB C680 |
| 7440 84FB | | 7538 962D | 75BE CE7466 | | 7647 BD7680 | 76BD 7E76B7 |
| 7442 B74150 | 74AD BD7680 | 753A 27F6 | 75C1 7E757B | | 764A BD76E7 | 76C0 5C |
| 7445 BA0C | 74B1 BD775B | 753C 7A0020 | | | 764D BD76C4 | 76C1 7E76B7 |
| 7447 B74150 | 74B3 CE7484 | 753F 7E7532 | 75C4 BD7680 | | 7650 CE747A | |
| 744A 976E | 74B6 7E757B | | 75C7 BD76E7 | | 7653 7E757B | 76C4 9622 |
| | | 7542 BD7680 | 75CA BD773B | | | 76C6 84F8 |
| 744C 9628 | | 7545 BD775B | 75CD CE7468 | | 7656 BD7680 | 76C8 BA08 |
| 744E 9722 | 74B9 BD7680 | 7548 CE7498 | 75D0 7E757B | | 7659 BD775B | 76CA 9722 |
| 7450 B74110 | 74BC BD76E7 | 754B 7E757B | | | 765C CE747C | 76CC B74110 |
| 7453 9628 | 74BF CE74C6 | | 75D3 BD7680 | | 765F 7E757B | 76CF 01 |
| 7455 84FD | 74C2 7E757B | 754E BD7680 | 75D6 BD77CB | | | 76D0 01 |
| 7457 9720 | | 7551 BD76E7 | 75D9 CE746A | | 7662 BD7680 | 76D1 01 |
| 7459 38 | 74C5 BD7680 | 7554 CE803A | 75DC 7E757B | | 7665 BD76E7 | 76D2 01 |
| | 74C8 BD787C | 7557 FF4424 | | | 7668 CE800A | 76D3 B64100 |
| 745A DE16 | 74CB CE7488 | 755A CE749A | 75DF BD7680 | | 766B FF4424 | 76D6 01 |
| 745C EE60 | 74CE 7E757B | 755D 7E757B | | | 766E CE747E | 76D7 01 |
| 745E 6E00 | | | 75E2 BD787C | | 7671 7E757B | 76D8 01 |
| | 74D1 BD7680 | | 75E5 CE746C | | | 76D9 01 |
| 7460 75A1 | 74D4 BD77CB | 7560 BD7680 | 75E8 7E757B | | | 76DA 01 |
| 7462 75AF | 74D7 CE742A | 7563 BD78D5 | | | 7674 BD7680 | 76DB 01 |
| 7464 75BB | 74DA 7E757B | 7566 CE749C | 75EB BD7680 | | 7677 BD78D5 | 76DC 01 |
| 7466 75CA | | 7569 7E757B | 75EE BD76E7 | | 767A CE749C | |
| 7468 75D3 | 74DD BD7680 | | 75F1 BD76C4 | | 767D 7E757B | 76DD 01 |
| 746A 75DF | 74E0 BD76E7 | 756C B65140 | 75F4 CE746E | | | 76DE 01 |
| | 74E3 BD76C4 | 756F 8540 | 75F7 7E757B | | 7680 9622 | 76DF 01 |
| 746C 75EB | 74E6 CE74EC | 7571 2712 | | | 7682 84F9 | 76E0 B64100 |
| 746E 75FA | 74E9 7E757B | 7573 CE3002 | 75FA BD7680 | | 7684 BA09 | 76E3 43 |
| 7470 7606 | | 7576 FF4424 | 75FD BD775B | | 7686 9722 | 76E4 971B |
| 7472 7615 | 74EC BD7680 | 7579 DE3B | 7600 CE7478 | | 7688 B74110 | 76E6 39 |
| 7474 7621 | 74EF BD775B | 757B DF16 | 7603 7E757B | | 768B 9699 | |
| 7476 763E | 74F2 CEFFFF | 757D 962B | | | 768D 8580 | 76E7 D622 |
| 7478 7647 | 74F5 FF4454 | | | | 768F 2729 | 76E9 C4FA |
| 747A 7656 | 74F8 CE74EE | 757F 9722 | 7606 BD7680 | | 7691 B64100 | 76EB CA0A |
| 747C 7662 | 74FB 7E757B | 7581 B74110 | 7609 CEFFFF | | 7694 01 | 76ED D722 |
| 747E 7674 | | 7584 3B | 760C FF4454 | | 7695 01 | 76EF F74110 |
| | 74FE BD7680 | 7585 1F | 760F CE7472 | | 7696 01 | 76F2 9637 |
| 7480 749E | 7501 BD76E7 | 7586 B630 | 7612 7E757B | | 7697 01 | 76F4 C520 |
| 7482 74AD | 7504 BD773B | 7588 B75456 | | | 7698 01 | 76F6 262E |
| 7484 74B9 | 7507 CE7490 | 758B CE40FF | 7615 BD7680 | | 7699 01 | 76F8 8126 |
| 7486 74C5 | 750A 7E757B | 758E FF5450 | 7618 BD76E7 | | 769A 01 | 76FA 2516 |
| 7488 74D1 | | 7591 863A | 761B CE7474 | | 769B 01 | 76FC 7A0037 |
| 748A 74DD | 750D BD7680 | 7593 B75456 | 761E 7E757B | | 769C 01 | 76FF B64100 |
| 748C 74EC | 7510 CE7492 | 7596 CE8000 | | | 769D 01 | 7702 01 |
| 748E 74FE | 7513 7E757B | 7599 FF5450 | 7621 BD7680 | | 769E B64100 | 7703 01 |
| 7490 750D | | 759C 0E | 7624 B65130 | | 76A1 43 | 7704 01 |
| 7492 7516 | 7516 BD7680 | 759D 7E7573 | 7627 8511 | | 76A2 F65140 | 7705 01 |
| 7494 751F | 7519 CE7494 | | 7629 2719 | | 76A5 C580 | 7706 01 |
| 7496 7542 | 751C 7E757B | 75A0 BD7680 | 762B 7C002D | | 76A7 2712 | 7707 01 |
| 7498 754E | | 75A3 BD76E7 | 762E CE7476 | | 76A9 C540 | 7708 01 |
| | | 75A6 BD76C4 | 7631 7E757B | | | 7709 01 |
| 749A 7563 | 751F BD7680 | 75A9 CE7462 | 7634 9620 | | 76AB 2700 | 770A 01 |
| | 7522 BD76E7 | 75AC 7E757B | 7636 27F6 | | 76AD F65120 | 770B 01 |
| 749C 756C | 7525 BD76C4 | | 7638 7A002D | | 76B0 8180 | |
| | 7528 B65130 | 75AF BD7680 | 763B 7E762E | | 76B2 2780 | 770C B64100 |
| 749E BD7680 | 752B 8511 | 75B2 BD775B | | | 76B4 243A | 771F 9711 |
| 74A1 BD76E7 | 752D 2719 | 75B5 CE7464 | 763E BD7680 | | 76B6 5A | 7711 39 |
| 7712 962B | 7781 2730 | 77FA B74456 | 7877 8696 | | 78F2 C508 | 777B D725 |
| 7714 8A20 | 7783 2502 | 77FD B640 | 7879 7E7855 | | 78F4 2651 | 797D F75180 |

| | | | | | |
|---|---|---|---|---|---|
| 7716 972B | 7785 DE26 | 77FF B7445L | | 78F6 DE55 | 7980 9682 |
| 7718 CA23 | 7787 DF26 | 7802 B64453 | 787C 862C | 78F8 FF5432 | 7982 B58C |
| 771A D722 | 7789 9626 | 7805 43 | 787E B75150 | 78FB 7E7961 | 7984 2601 |
| 771C F74118 | 778B D627 | 7806 F64451 | 7881 8680 | 78FE B640 | 7986 39 |
| 771F B680 | 778D 9F45 | 7809 F64452 | 7883 B74456 | 7900 9720 | 7987 9638 |
| 7721 9737 | 778F D946 | 780C 53 | 7886 B640 | 7902 B65128 | 7989 914C |
| 7723 7E76FF | 7791 56 | 780D D7A8 | 7888 B74466 | 7905 8180 | 798B 25CC |
| 7726 81DF | 7792 46 | 780F F64453 | 788B B64460 | 7907 2405 | 798D 913F |
| 7728 2406 | 7793 9745 | 7812 D621 | 788E 43 | 7909 864C | 798F 2410 |
| 772A 7C0037 | 7795 9726 | 7814 C548 | 788F F64461 | 790B 7E78E2 | 7991 C4D7 |
| 772D 7E76FF | 7797 D746 | 7816 2627 | 7892 F644C2 | 790E B5B2 | 7993 D725 |
| 7731 962B | 7799 D727 | 7818 D633 | 7895 53 | 7911 7E78E2 | 7995 F75100 |
| 7732 84DF | 779B DE26 | 781A 26CC | 7896 D7A8 | 7913 962D | 7998 39 |
| 7734 972B | 779D FF5474 | 781C D621 | 7898 F64463 | 7915 B180 | 7999 CA2B |
| 7736 C4DF | 77A0 54 | 781E CA40 | 789B 91A8 | 7917 24E5 | 799B D725 |
| 7738 7E771A | 77A1 46 | 7820 D721 | 789D 2721 | 7919 B65128 | 799D F75100 |
| | 77A2 C110 | 7822 9631 | 789F 241F | 791C B1E8 | 79A0 39 |
| 773B D622 | 77A4 2608 | 7824 B75150 | 78A1 D6A8 | 791E 2409 | 79A1 CA2C |
| 773D CA0F | 77A6 919D | 7827 39 | 78A3 D79C | 7921 812E | 79A3 C4F7 |
| 773F D722 | 77A8 250A | 7828 91A8 | 78A5 9C7B | 7922 253A | 79A5 D725 |
| 7741 F74110 | 77AA 919E | 782A 27F6 | 78A7 9B9C | 7924 8688 | 79A7 F75100 |
| 7744 01 | 77AC 250C | 782C 2507 | 78A9 B196 | 7926 7E78E2 | 79AA 39 |
| 7745 01 | 77AE CEFF70 | 782E C501 | 78AB 2423 | 7929 86E0 | |
| 7746 01 | 77B1 DF3F | 7830 2707 | 78AD 812C | 792B 7E78E2 | |
| 7747 01 | 77B3 39 | 7832 7E7822 | 78AF 251A | 792E 8621 | |
| 7748 B64100 | 77B4 CE9000 | 7835 C501 | 78B1 9198 | 7930 7E78E2 | |
| 774B 01 | 77B7 7E77C1 | 7837 27E9 | 78B3 2705 | 7933 DE53 | |
| 774C 01 | 77BA CEB350 | 7839 7A0033 | 78B5 250E | 7935 FF5432 | |
| 774D 01 | 77BD 7E77B1 | 783C 7E7822 | 78B7 7C0090 | 7938 7C7972 | |
| 774E 01 | 77C0 9626 | 783F 91A8 | 78BA 9698 | 793B C520 | |
| 774F 01 | 77C2 9128 | 7841 2724 | 78BC B75150 | 793D 2610 | |
| 7750 01 | 77C4 27C1 | 7843 2422 | 78BF 39 | 793F DE57 | |
| 7751 01 | 77C6 25BF | 7845 D6A8 | 78C0 979B | 7941 FF5432 | |
| 7752 01 | 77C8 7E77B5 | 7847 D730 | 78C2 7E78A5 | 7944 7E7972 | |
| 7753 01 | | 7849 9634 | 78C5 7A0898 | 7947 DE57 | |
| 7754 01 | 77CB 8696 | 784B 9B3D | 78C8 7E78BA | 7949 FF5432 | |
| 7755 B64108 | 77CD B75150 | 784D 8196 | 78CB 862C | 794C 7E7954 | |
| 7758 9767 | 77D0 8680 | 784F 2426 | 78CD 7E78B1 | 794F DE57 | |
| 775A 39 | 77D2 B74456 | 7851 812C | 78D0 8696 | 7951 FF5432 | |
| | 77D5 FE4454 | 7853 251D | 78D2 7E78B1 | 7954 DE4F | |
| 775E B680 | 77D8 DF35 | 7855 9131 | | 7956 FF5424 | |
| 775D B74446 | 77DA 730035 | 7857 2705 | 78D5 D602 | 7959 7E7977 | |
| 7761 8641 | 77DD 731036 | 7859 2511 | 78D7 C580 | 795C DE5B | |
| 7762 B74446 | 77E0 F64260 | 785B 7C0031 | 78D9 2758 | 795E FF5432 | |
| 7765 FE4442 | 77E3 C415 | 785E 9631 | 78DB C520 | 7961 DE51 | |
| 7768 DF26 | 77E5 2711 | 7860 B75150 | 78DD 2734 | 7963 FF5424 | |
| 776A FE4444 | 77E7 C115 | 7863 44 | 78DF B65120 | 7966 7E7977 | |
| 776D DF28 | 77E9 270D | 7864 9732 | 78E2 D625 | 7969 C520 | |
| 776F 731026 | 77EB B688 | 7866 39 | 78E4 9738 | 796B 26EF | |
| 7772 730027 | 77ED 9733 | 7867 9734 | 78E6 9140 | 796D DE55 | |
| 7775 730028 | 77EF 9621 | 7869 7E7849 | 78EB 2551 | 796F FF5432 | |
| 7778 730029 | 77F1 B4BF | 786C 7A0031 | 78EA 913F | 7972 DE4D | |
| 777B DE28 | 77F3 9721 | 786F 7C785E | 78EC 247D | 7974 FF5424 | |
| 777D 9627 | 77F5 7E7822 | 7872 862C | 78EE C520 | 7977 D625 | |
| 777F 912F | 77F8 B610 | 7874 7C7855 | 78F1 2741 | 7979 C4DF | |

What is claimed is:

1. A nonlinear speed control apparatus for varying the speed of special motion effects in a magnetic video tape recording and reproducing machine having a transducing head that is movable transversely of a track of video information on the tape, said apparatus comprising:

a servo means for controlling the transverse movement of the transducing head that is movable to accurately follow a track during reproducing of a track and to selectively automatically position the head to begin following the next desired track subsequently of the completion of the following of a track;

a capstan servo for moving the tape during reproducing, said capstan servo including a programmable counting means having an input signal of a predetermined frequency and which provides an output signal having a frequency proportional to the input signal frequency divided by a variable preselected number, the speed of capstan being proportional to the frequency of the output signal of the counting means;

means having positional settings for providing a speed control signal, the value of which varies with the positional setting thereof;

processing means generating said preselected number in response to the speed control signal and changes in the same and for providing said preselected number of said counting means, said processing means being responsive to changes in the setting of said speed control signal providing means to provide a preselected number that varies non-linearly with incremental changes in the speed control signal productive of a lesser percentage change in tape speed at relatively faster than normal special motion effect speeds and a greater percentage change at slow motion effect speeds.

2. A speed control apparatus as defined in claim 1 wherein said means for providing said speed control signal comprises a potentiometer which provides an analog voltage that is directly proportional to the setting thereof through its operating range.

3. Apparatus as defined in claim 2 wherein said potentiometer further comprises a rotatable potentiometer.

4. Apparatus as defined in claim 2 wherein said processing means includes an analog-to-digital converter adapted to receive the analog output of said potentiometer and provide a digital signal, the value of which is proportional to the analog value applied at the input thereof and indicative of the positional setting of said potentiometer.

5. Apparatus as defined in claim 4 wherein said digital signal provided by said analog-to-digital converter comprises an 8-bit digital word, said processing means multiplying the value of the 8-bit word by the function $K+(\text{8-bit word}/225)^3$ where K is a constant.

6. Apparatus as defined in claim 1 wherein said processing means in response to a change in the speed control signal inserts a delay in the changing of the preselected number that is provided to said counting means, wherein the amount of delay is directly proportional to the speed of the special motion effect reproducing, said delay being eliminated at slow motion reproducing speeds.

7. In a video tape recording and reproducing apparatus of the type which has a rotating scanning drum with a movable element carrying a transducing head that is transversely movable relative to the longitudinal orientation of the track to be produced, a servo means for controlling the transverse movement to accurately follow a track during reproducing of a track and to selectively automatically position the head to begin following the next desired track to be reproduced subsequently of the completion of reproducing of a track, and a capstan drive means for moving the tape during reproducing, a speed control apparatus for nonlinearly varying the speed of special motion effects thereof, said speed control apparatus comprising:

a capstan servo for said capstan drive means, said capstan servo including a programmable counting means that receives an input clock signal of a predetermined frequency at a frist input and which provides an output signal having a frequency corresponding to the clock signal frequency divided by a number that corresponds to the value of a digital word applied at a second input thereto, the capstan servo causing said capstan to drive the tape at a speed that is proportional to the frequency of the output signal of the counting means;

processing means for providing a digital word to said second input of said counting means, said digital word being a function of a variable spee control signal and of changes in the same, the processing means being responsive to changes of the speed control signal to delay changing the digital word with greater amounts of delay being provided upon changes made in the speed control signal at speeds faster than normal reproducing speed and very little delay being provided in response to changes that are made in the speed control signal while reproducing at slow motion speeds.

8. A speed control apparatus as defined in claim 7 wherein said digital word provided by said processing means to said counting means is varied nonlinearly in response to uniform incremental changes of said speed control signal to produce a correspondingly less percentage change in tape speed at relatively faster than normal special motion effects speeds and a proportioanlly greater percentage change in speed at slow motion effect speeds.

9. A nonlinear speed control apparatus for varying the transport speed of tape in a magnetic tape recording and reproducing machine, comprising:

means for transporting the tape at a speed proportional to a parameter of a driving signal;

movable means having positional settings for providing a speed control signal which varies with the positional setting of said movable means; and means responsive to the speed of the tape and to said speed control signal for varying said parameter of said driving signal in a non-linear fashion with incremental changes in said speed control signal to produce a smaller percentage change in the speed of the tape at relatively faster speeds and a greater percentage change at slower speeds.

10. The apparatus of claim 9 wherein said parameter is the frequency of the driving signal.

11. The apparatus of claim 9 wherein the response of said parameter varying means to changes in said speed control signal is delayed by a variable length of time that is proportional to the speed of the tape over at least part of the tape speed range.

12. The apparatus of claim 11 wherein said delay is proportional to the speed of the tape at tape speeds in the range of normal speed and faster.

13. A speed control apparatus for varying the transport speed of a tape in a magnetic tape recording and reproducing machine, comprising:

means for transporting the tape at a speed proportional to the parameter of a driving signal; movable means having positional settings for providing a speed control signal which varies with the positional setting of said movable means; and means responsive to the speed of the tape and to said speed control signal for varying said parameter of said driving signal with a delay between the time that a change occurs in said speed control signal and the time that the corresponding variation in said parameter occurs, said delay being proportional to the speed of the tape in the range of normal playback speed and above.

14. A nonlinear speed control apparatus for varying the transport speed of tape in a magnetic tape recording and reproducing machine, said apparatus comprising:

means for moving the tape, said moving means including a programmable counting means receiving an input signal of a predetermined frequency and providing an output signal having a frequency proportional to the input signal frequency divided by a variable preselected number, the speed of the tape being proportional to the frequency of the output signal of the counting means;

means having positional settings for providing a speed control signal, the value of which varies with the positional setting of said means; and processing means for providing said preselected number to said counting means, said number being a function of the speed control signal and of changes in the same, said processing means being responsive to changes in the setting of said speed control signal providing means to produce a preselected number that varies non-linearly with incremental changes in the speed control signal productive of a lesser percentage change in speed of the tape at relatively fast speeds and a greater percentage change at slow speeds.

15. A speed control apparatus as defined in claim 14 wherein said means for providing said speed control signal comprises a potentiometer which provides an analog voltage that is directly proportional to the setting thereof through its operating range.

16. Apparatus as defined in claim 15 wherein said processing means includes an analog-to-digital converter adapted to receive the analog voltage of said potentiometer and provide a digital signal, the value of which is proportional to the analog voltage applied at the input thereof and indicative of the positional setting of said potentiometer.

17. Apparauts as defined in claim 16 wherein said digital signal provided by said analog-to-digital converter comprises an 8-bit word, said processing means multiplying the value of the 8-bit word by the function $K+(\text{8-bit word}/225)^3$, where K is a constant.

18. Apparatus as defined in claim 14 wherein said processing means delays changing the number that is provided to said counting means, said delay being proportional to the speed of the tape at relatively higher tape speeds.

19. In a video tape recording and reproducing apparatus, a speed control apparatus for nonlinearly varying the speed of movement of the tape relative to a reproducing head, comprising:

drive means, including a programmable counting means that is driven by an input signal of a predetermined frequency and which provides an output signal having a frequency corresponding to the input signal frequency divided by a number that corresponds to the value of digital word applied at a second input thereto, said drive means causing the tape to move relative to the reproducing head at a speed that is proportional to the frequency of the output signal of the counting means; and processing means for providing a digital word to said second input of said counting means, said digital word being a function of a speed control signal that is applied thereto and of chanes in the same, the processing means being responsive to changes of the speed control signal to delay changing the digital word with greater amounts of delay being provided upon changes made in the speed control signal at relatively fast reproducing speeds than are provided in response to changes made in the speed control signal while reproducing at slow speeds.

20. A speed control apparatus as defined in claim 19 wherein the digital word provided by said processing means to said counting means represents a number that varies nonlinearly in response to uniform increments of said speed control signal to produce a correspondingly less percentage change in relative speed of the tape at faster speeds and a proportionally greater percentage change in speed at slower speeds.

* * * * *

UNITED STATES PATENT AND TRADEMARK OFFICE
CERTIFICATE OF CORRECTION

PATENT NO. : 4,538,190
DATED : August 27, 1985
INVENTOR(S) : Kenneth Louth

It is certified that error appears in the above-identified patent and that said Letters Patent is hereby corrected as shown below:

Column 31, line 7, after "means" insert --for--;

Column 31, line 10, change "of" to --to--;

Column 31, line 37, change "(8-bit word/225)$^3$" to $--\frac{(8\text{-bit word})^3}{225}--$;

Column 31, line 50, change "produced" to --reproduced;

Column 31, line 63, change "frist" to --first--;

Column 32, line 3, change "spee" to --speed--;

Column 32, line 20, change "proportioanlly" to --proportionally--;

Column 32, line 47, after "normal" insert --playback--;

Column 33, line 31, change "apparauts" to --apparatus--;

Column 33, line 33, after "bit" insert --digital--;

Column 33, line 35, change "(8-bit word/225)$^3$" to $--\frac{(8\text{-bit word})^3}{225}--$;

Column 34, line 13, after "of" insert --a--;

Column 34, line 21, change "chanes" to -- change--;

Abstract, first line, change "monlinear" to --nonlinear--;

UNITED STATES PATENT AND TRADEMARK OFFICE
CERTIFICATE OF CORRECTION

PATENT NO. : 4,538,190

DATED : August 27, 1985

INVENTOR(S) : Kenneth Louth

It is certified that error appears in the above-identified patent and that said Letters Patent is hereby corrected as shown below:

Column 2, line 40, after "capstan" delete rest of sentence;

Column 2, line 40, after "capstan" insert --servo to control the transport of the tape so that the proper speed is achieved--;

Column 2, line 46, after "high" insert --tape transport speed--;

Column 2, line 46, after "speed," delete --tape transport--;

Column 2, line 46, after "speed," insert --such as for--;

Column 3, line 5, after "visually" insert --disruptive--;

Column 3, line 39, before "board" insert --a--;

Column 5, line 27, change "of" to --or--;

Column 5, line 57, after "off" insert --of--;

Column 5, line 67, change "charts" to --chart--;

Column 7, line 26, after "has" insert --as--;

Column 7, line 56, change "624" to --625--;

Column 8, line 6, change "capstant" to --capstan--;

Column 8, line 24, change "mode" to --modes--;

Column 8, line 65, change "liines" to --lines--;

Column 8, line 66, change "287" to --286--;

Column 9, line 12, change "circuiry" to --circuitry--;

Column 10, line 39, after "port" insert --and--;

Column 10, line 58, change "650" to --640--;

UNITED STATES PATENT AND TRADEMARK OFFICE
CERTIFICATE OF CORRECTION

PATENT NO. : 4,538,190

DATED : August 27, 1985

INVENTOR(S) : Kenneth Louth

It is certified that error appears in the above-identified patent and that said Letters Patent is hereby corrected as shown below:

Column 11, line 40, change "688" to --668--;

Column 13, line 40, change "of" to --to--;

Column 14, line 22, change "requied" to --required--;

Column 15, line 10, change "(8-bit word/225)$^3$" to --$\frac{(8\text{-bit word})^3}{225}$--;

Column 15, line 24, change "225" to --255--;

Column 15, line 49, change "9c" to --27c--;

Column 16, line 17, change "as" to --an--;

Column 10, line 30, change "signil" to --signal--;

Column 14, line 66, change "anngular" to --angular--;

Column 15, line 24, change "diviser" to --divisor--.

Signed and Sealed this

Twenty-ninth Day of April 1986

[SEAL]

Attest:

DONALD J. QUIGG

Attesting Officer

Commissioner of Patents and Trademarks